(12) United States Patent
Hijlkema

(10) Patent No.: US 8,097,196 B2
(45) Date of Patent: Jan. 17, 2012

(54) METHOD AND DEVICE FOR MANUFACTURING A MOULD, AND METHOD AND DEVICE FOR MANUFACTURING A PRODUCT USING THE MOULD

(75) Inventor: Bernardus Ludgerus Lubertus Hijlkema, Leeuwarden (NL)

(73) Assignee: Interra Bouwburo B.V., CV Joure (NL)

( * ) Notice: Subject to any disclaimer, the term of this patent is extended or adjusted under 35 U.S.C. 154(b) by 325 days.

(21) Appl. No.: 11/886,859

(22) PCT Filed: Apr. 5, 2006

(86) PCT No.: PCT/NL2006/000175
§ 371 (c)(1),
(2), (4) Date: Apr. 14, 2008

(87) PCT Pub. No.: WO2006/107194
PCT Pub. Date: Oct. 12, 2006

(65) Prior Publication Data
US 2009/0032677 A1    Feb. 5, 2009

(30) Foreign Application Priority Data
Apr. 5, 2005    (NL) .................................... 1028693

(51) Int. Cl.
*B29C 33/40* (2006.01)
(52) U.S. Cl. ........ 264/225; 264/299; 264/313; 249/155; 249/161; 72/413

(58) Field of Classification Search ............ 264/225, 264/299, 313; 249/155, 161; 72/413
See application file for complete search history.

(56) References Cited

U.S. PATENT DOCUMENTS

| | | | |
|---|---|---|---|
| 5,151,277 A * | 9/1992 | Bernardon et al. | 425/112 |
| 5,253,176 A | 10/1993 | Todoroki et al. | |
| 5,770,136 A * | 6/1998 | Huang | 264/101 |
| 6,209,380 B1 * | 4/2001 | Papazian et al. | 72/413 |

FOREIGN PATENT DOCUMENTS

| | | | |
|---|---|---|---|
| EP | 0499420 | | 8/1992 |
| FR | 2576244 | | 7/1986 |
| IN | 187203 B | * | 3/2002 |

OTHER PUBLICATIONS

International Search report, Aug. 9, 2006.

* cited by examiner

*Primary Examiner* — Richard Crispino
*Assistant Examiner* — Elizabeth Royston
(74) *Attorney, Agent, or Firm* — Harness, Dickey & Pierce, P.L.C.

(57) ABSTRACT

In one embodiment of the present invention, a method and device are disclosed for manufacturing a mould for the manufacture of at least one product. The product can be a concrete body. The method includes: adjusting a rough shape which roughly approximates, with clearance, the shape of a side of the product; arranging a layer of processible material over the rough shape, and processing the layer of material in accordance with almost exactly the shape of the product.

15 Claims, 24 Drawing Sheets

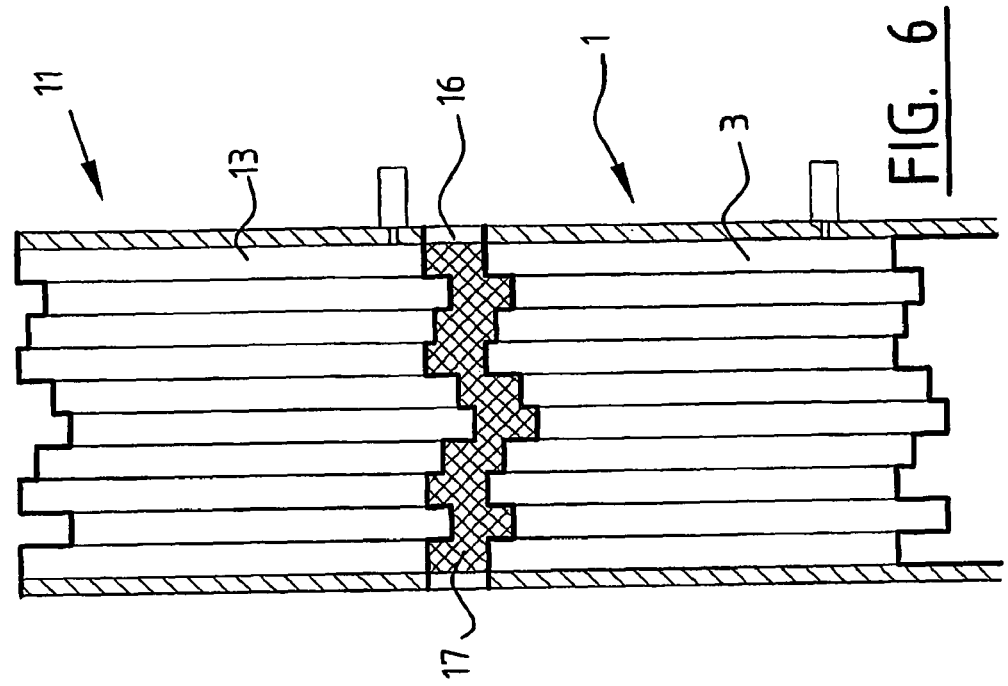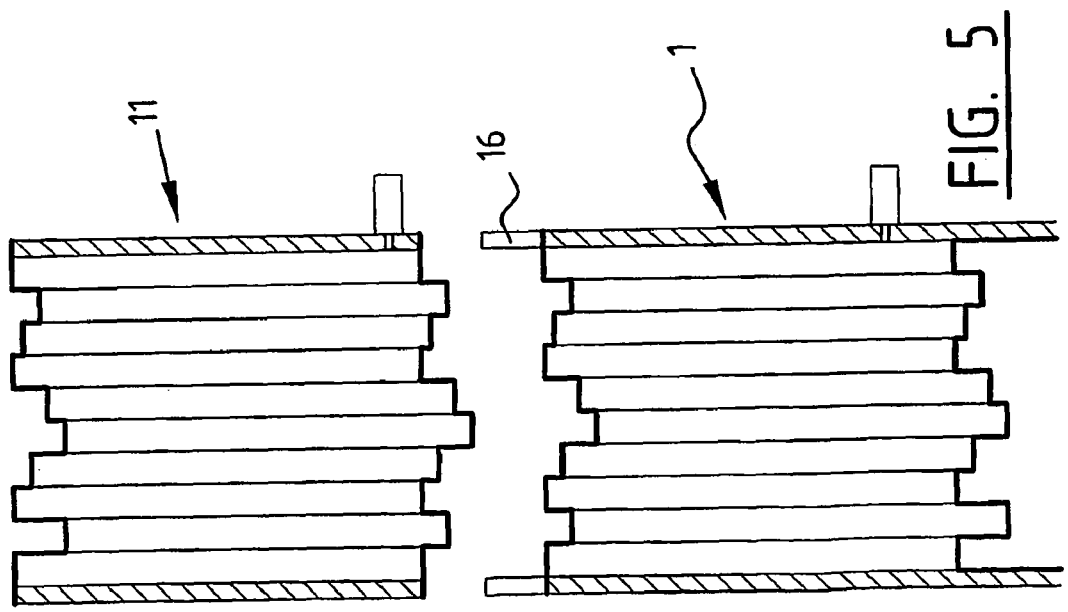

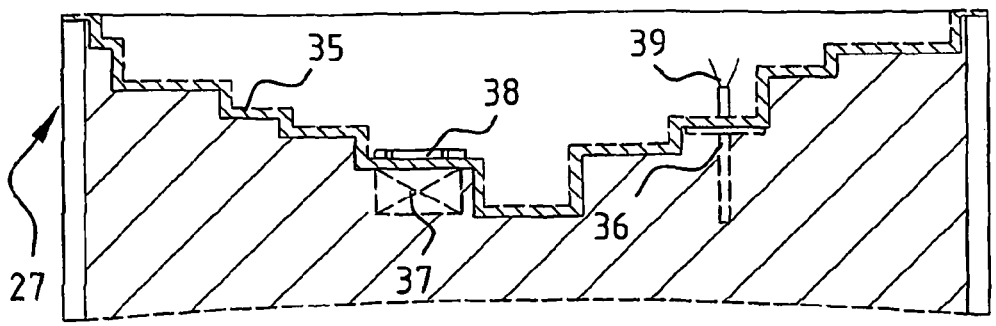
FIG. 29
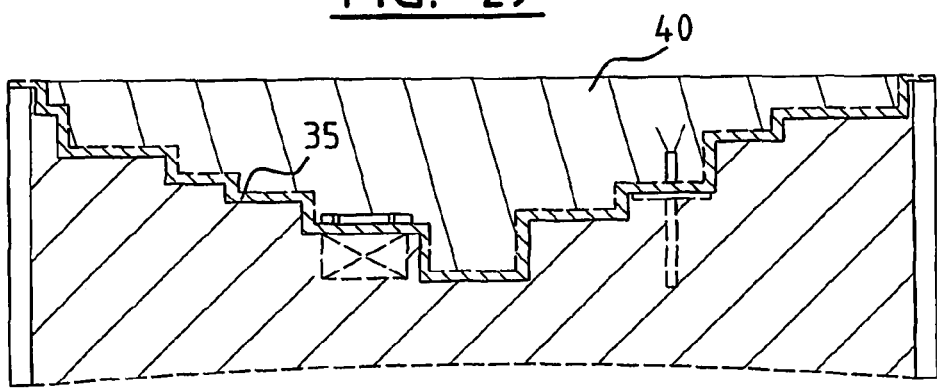
FIG. 30
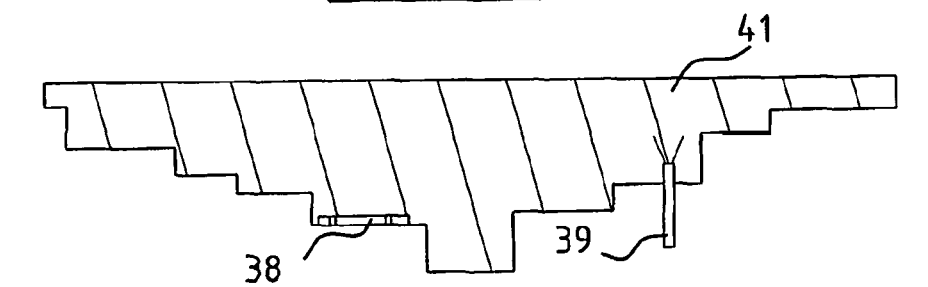
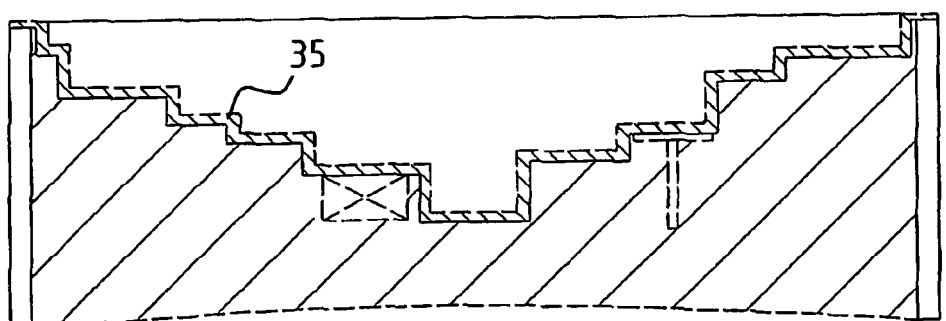
FIG. 31

METHOD AND DEVICE FOR MANUFACTURING A MOULD, AND METHOD AND DEVICE FOR MANUFACTURING A PRODUCT USING THE MOULD

The present invention relates to a method and a device for manufacturing a mould, and a method and a device for the manufacture of at least one product, such as a concrete body, using this mould.

It is known to use a mould for the manufacture of products. A rectangular block of processable material is herein taken and made into almost exactly the desired shape by for instance machining thereof. The material usage is high here, which results in the manufacture of small batches and individual products being unacceptably expensive. In addition, much waste remains after the machining process, which waste must in turn be processed or removed.

The present invention has for its object to obviate or at least to reduce the problems and drawbacks of the known art, for which purpose a method is provided, comprising of: adjusting a rough shape which roughly approximates the shape of a side of the product; arranging a layer of processable material over the rough shape; and processing the layer of material in accordance with almost exactly the shape of the side of the product.

The invention makes it possible to suffice with a small amount of material for processing or machining; the layer suffices without a whole block having to be used. The rough shape is reusable and adjustable for reuse as the basis for a new mould.

The invention thus also relates to a method for the manufacture of products, as well as a device for manufacturing such moulds and a device for the manufacture of the products.

The invention has many preferred embodiments, which are defined in the dependent claims 2-15.

Adjusting of the approximate shape can thus comprise of: using an adjusting unit with a holder and a number of adjusting elements associated therewith which can be moved individually or as a group relative to each other and the holder, and with arresting means for fixing the adjusting elements; placing the adjusting elements in the desired positions thereof; and setting the arresting means into operation. This is a simple and elegant way of realizing the invention. Placing of the adjusting elements in a desired position can herein comprise of: using at least one drive displaceable relative to the holder and to the adjusting elements; positioning the drive relative to a selected adjusting element; and energizing the drive until the selected adjusting element has taken up the desired position. If the selected adjusting element is then fixed, it is possible to realize a fully automated method as well as device. The drive can be a displaceable hydraulic or pneumatic cylinder or a motor-driven spindle shaft. A linear motor or a stepping motor is also possible, optionally in combination with a spindle shaft.

In an alternative or additional embodiment the method can further comprise of: forming in the same manner a counter-mould having the exact shape of another side of the product. By then manufacturing products between the mould and the counter-mould it is possible to realize three-dimensional creations of practically free design, including shell parts, spheres, etc.

The method can further also comprise of: copying the rough shape by arranging copying means on the rough shape so that the copying means take on the rough shape. This can be extremely favourable for some applications, for instance when arranging the layer of material comprises of: placing the rough shape and the copying means at a distance relative to each other; and arranging the material therebetween. A method is hereby provided of manufacturing the mould in very controlled manner and with ultimately minimal material losses of the material for processing. The copying means can advantageously also comprise an adjusting unit, as is also applied as a support for the material for processing. The number of different operations and components can then be limited, since the copying means and the means for adjusting the rough shape are substantially the same and are used in the same manner. A method with copying means can further comprise of: arranging a second layer of processable material on the copying means; processing the layer of material in accordance with almost exactly the shape of another side of the product. A thin, three-dimensional product, such as a shell part, can thus be made between the exact shape and the copying means with a layer of processed material thereon.

There are also embodiments of the invention which further comprise of: copying the exact shape of the side of the product, after processing of the layer of material, by arranging the copying means on the layer of material so that the copying means take on the exact shape thereof. If a product is then manufactured between the exact shape and the copying means, both sides thereof are identical.

In a method according to the invention with copying means, the copying means can comprise a vacuum package. This is a simple embodiment wherein granulate in the bag-like vacuum package is placed loosely on a surface (rough shape, or exact shape after processing of the layer of material) and adapts to the shape possibly by means of creating a vacuum, this shape being retained by creating a vacuum in the package.

Within the scope of the present invention it is also possible in an embodiment with exact copying means, such as the vacuum package, that the copying means form the mould. This is then particularly advantageous if a spherical shape of the product for manufacturing is desired, for which purpose the processing of the layer of material can also take place on a spherical shape. Means used for processing the layer of material, such as a cutter, can then be driven in a simpler manner than when a hollow shape must be processed into the material for processing.

The invention will be further described hereinbelow on the basis of a number of embodiments shown in the accompanying drawings, to which the invention is however not limited, in which:

FIG. 1-11 show a first embodiment of a device and a method according to the present invention;

FIG. 20-31 show a fourth embodiment;

Figure 1:
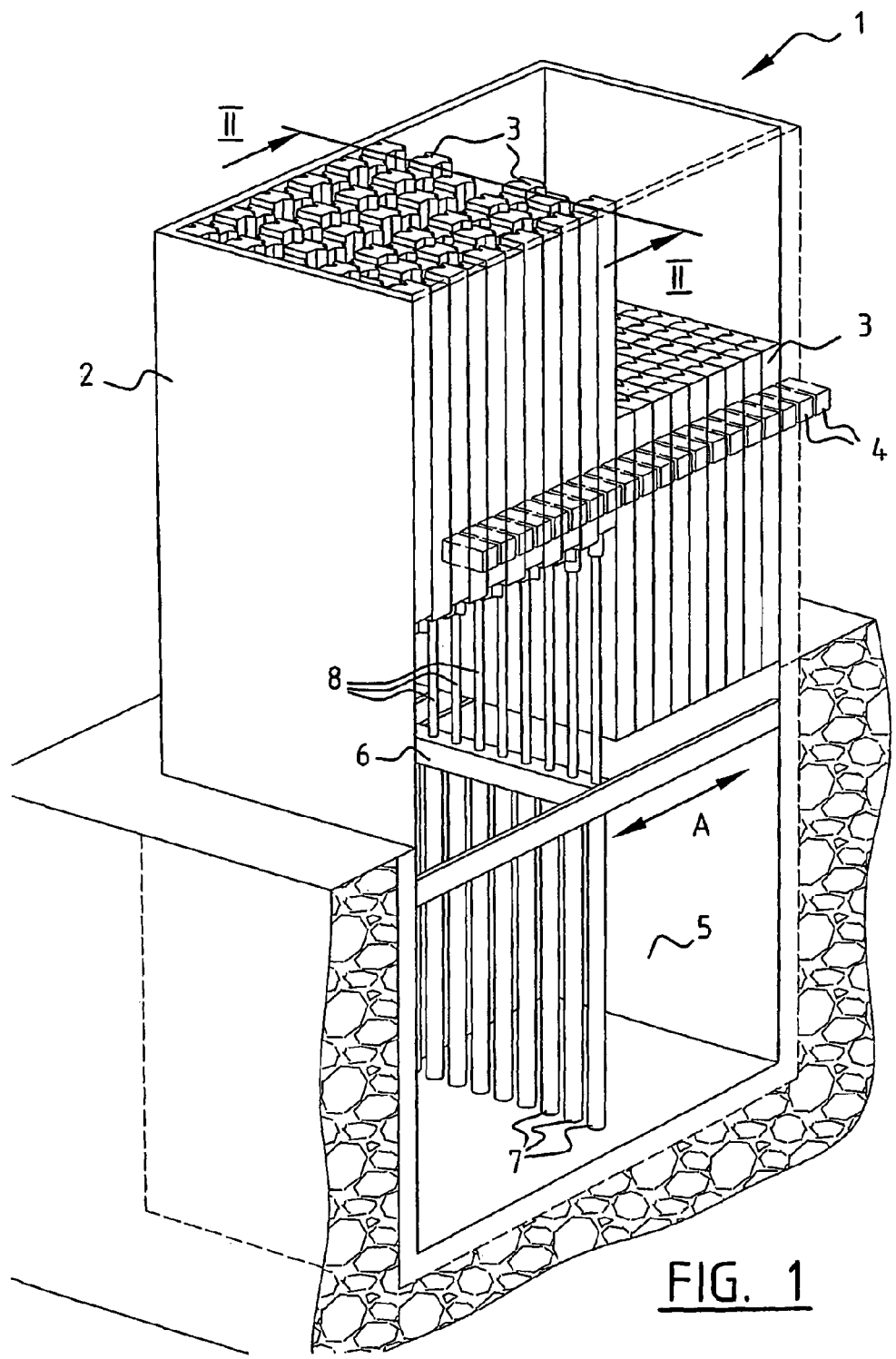

FIG. 1-12 show a first embodiment of a method and a device according to the present invention. Provided herein is an adjusting unit 1 which comprises a bottomless holder 2 with adjusting elements 3 therein which are movable in longitudinal direction thereof. The adjusting elements are formed as tubular profiles and can be fixed in holder 2 and relative to each other using arresting means 4 which can be realized in random manner, therefore also in transverse or lateral direction. Adjusting unit 1 is placed on a pit 5 in which a girder 6 is displaceable in the direction of double arrow A.

Mounted on girder 6 are cylinders 7, which operate as drives for setting the position of each of the adjusting elements 3 in the form of tubular profiles. When cylinders 7 are energized, the piston rods extend (or retract), whereby adjusting elements 3 can be carried to a desired height.

On girder 6 is arranged the same number of cylinders 7 as the number of adjusting elements 3 in a row in width direction of holder 2. Cylinders 7 can be embodied as desired as cylinders which are hydraulic or pneumatic or drivable in other manner, or alternatively as a motor, optionally a linear motor, with a spindle shaft.

Girder 6 with cylinders 7 thereon is positioned relative to and aligned with a row of adjusting elements 3. Each cylinder 7 is then energized separately in order to carry to a desired height an associated adjusting element 3 in the relevant row. This can take place under computer control.

When a row of adjusting elements 3 has been placed at a desired height using cylinders 7 on girder 6, arresting means 4 are energized in order to simultaneously fix all adjusting elements 3 in an associated row.

When a row of adjusting elements 3 has each been individually placed at a desired position relative to holder 2 in the above described manner, girder 6 is displaced in the direction of arrow A after retraction of the cylinders and positioned relative to and aligned with a subsequent row of adjusting elements 3. By repeating these steps all adjusting elements 3 can be set per row in order to adjust the rough shape for a mould, which rough shape corresponds approximately with one side of a product for manufacturing. It is noted that the rough shape is only an approximation of the side of the product for manufacturing, since the tubular profiles used as adjusting elements 3 are closed on the top side and only stepwise adjusting of the shape is hereby possible.

Figure 2:
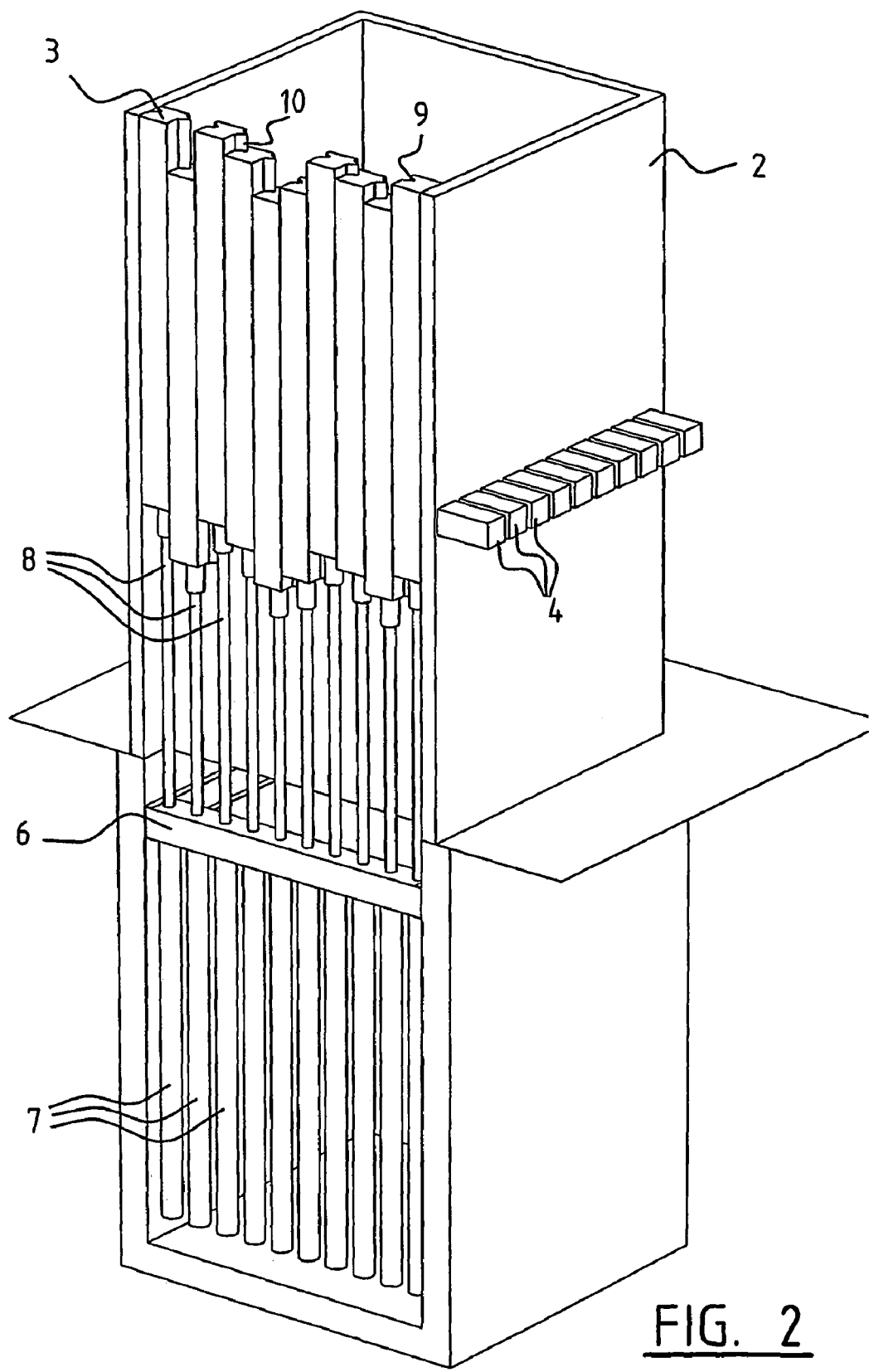

It is also noted that in the orientation of arresting means 4 as shown in FIG. 2 the adjusting elements in the form of tubular profiles 3 comprise guides for movement relative to each other. These guides are formed by grooves 9 with protrusions 10 projecting therein. Alignment of adjusting elements 3 relative to each other in a row is hereby realized, wherein it is noted that only a single row is shown in FIG. 2.

Figure 3:
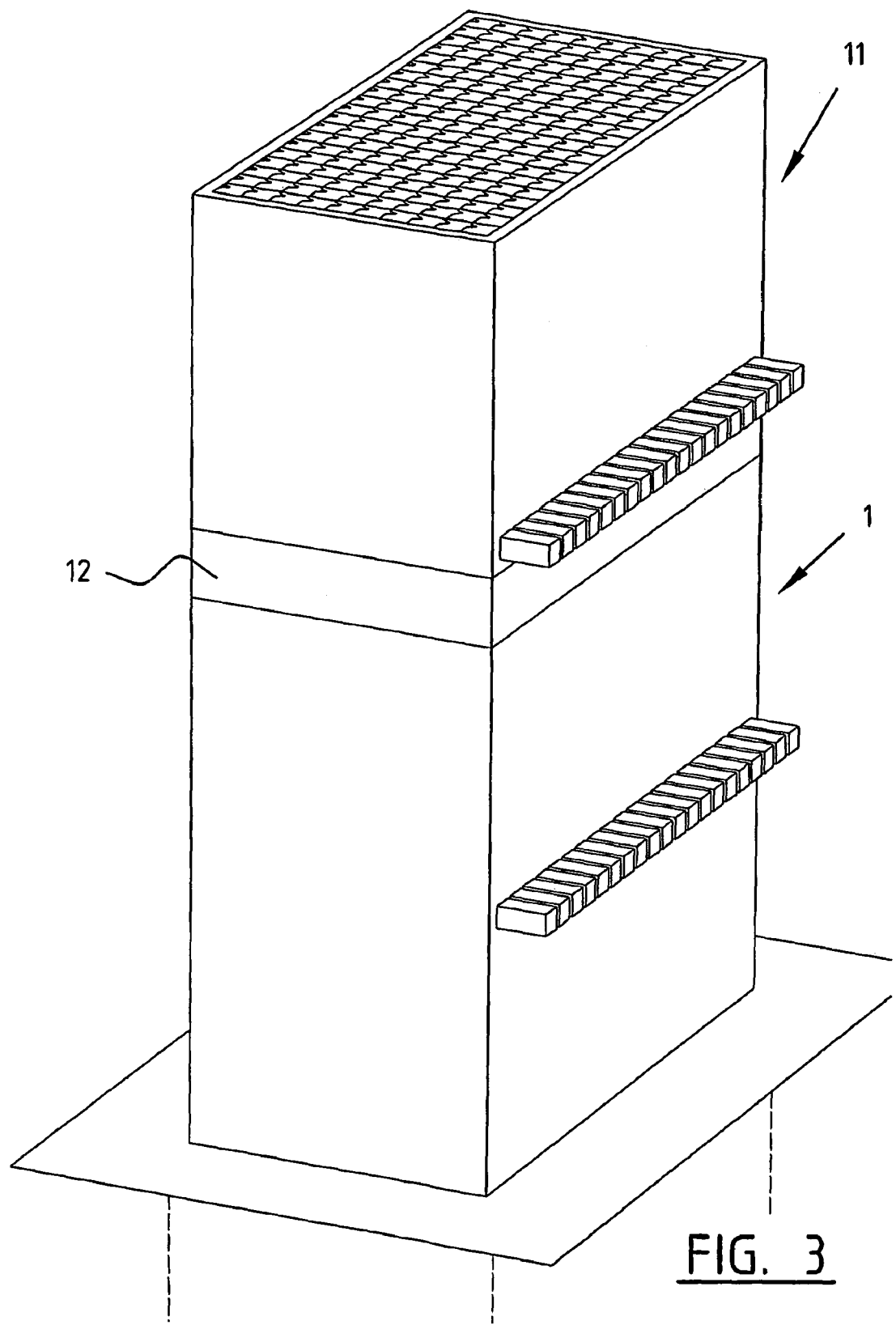

FIG. 3 shows copying means 11 which are placed on top of adjusting means 1. Copying means 11 are substantially the same as the adjusting means, as will become further apparent hereinbelow. An intermediate element 12 is arranged between copying means 11 and adjusting means 1.

Figure 4:
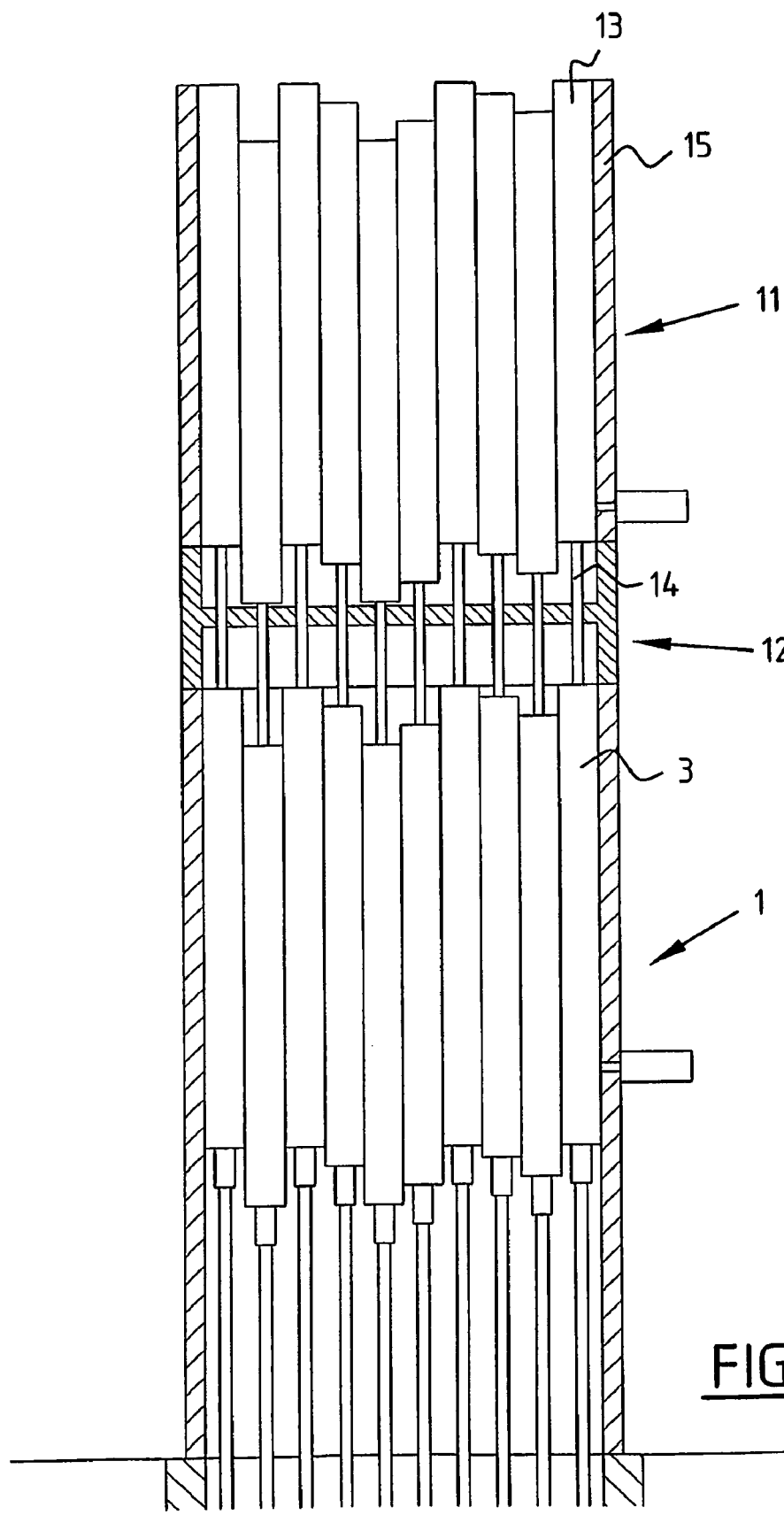

As shown in FIG. 4, a number of tubular profiles 13 can be adjusted in accordance with the position of adjusting elements 3 of adjusting unit 1 using intermediate element 12. The intermediate element comprises a number of movable rods 14 which extend between tubular profiles 13 of copying means 11 and adjusting elements 3 of adjusting unit 1. Each tubular profile 13 of copying means 11 can thus be placed in a practically identical and preferably also fixed position relative to adjusting elements 3, to each other and to a housing 15 of the copying means.

Figure 7:
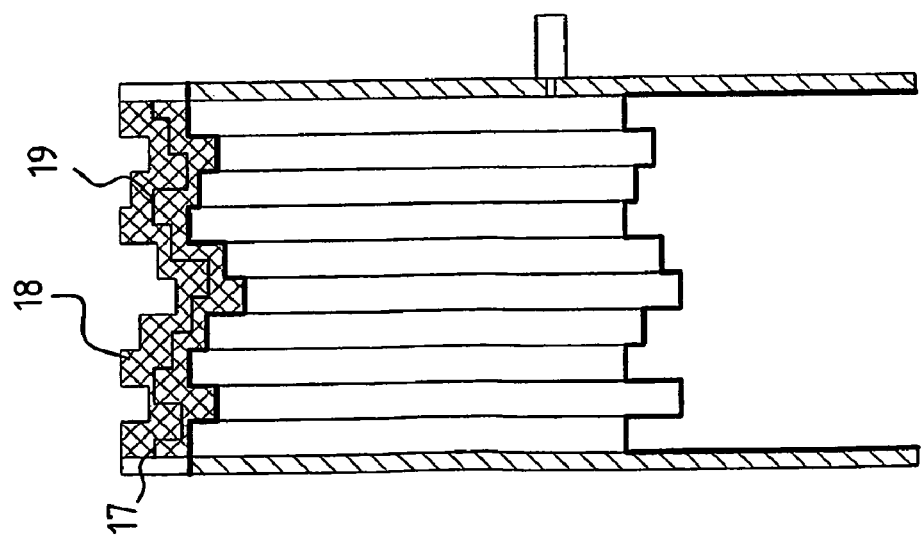

When the stage shown in FIG. 4 has been reached, intermediate element 12 can then be removed and a closing part 16 can be placed instead between copying means 11 and adjusting unit 1, as shown in FIG. 5. After connecting copying means 11 thereto, the space between tubular profiles 13 and adjusting elements 3 can be filled with processable material such as polyurethane foam 17, as shown in FIG. 6. This preferably takes place after the bottom sides and top sides of adjusting means 3 and tubular profiles 13 have been provided with flexible rubber membranes, and a vacuum is then created in adjusting means 3 and tubular profiles 13. As shown in FIG. 7, housing 15 can then be removed from copying means 11, whereafter polyurethane foam 17 has a contour 18, while the desired contour 19 is lower.

Figure 9:
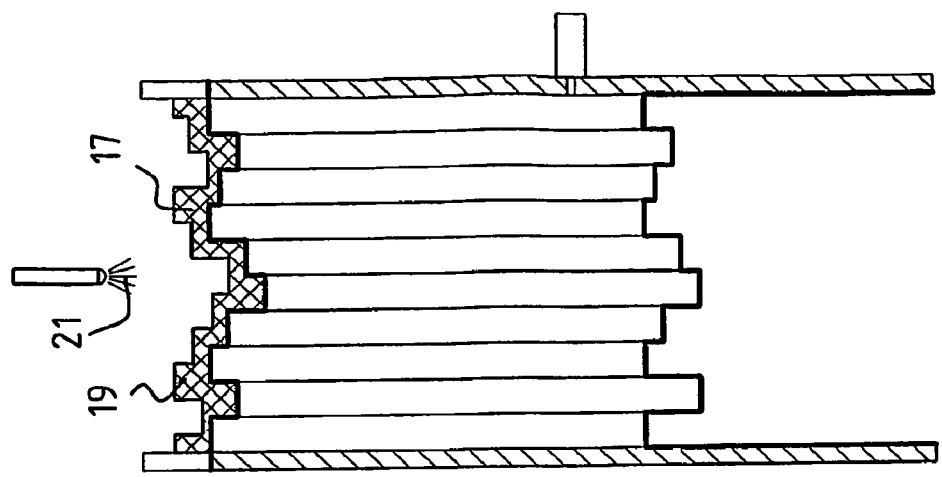
Figure 8:
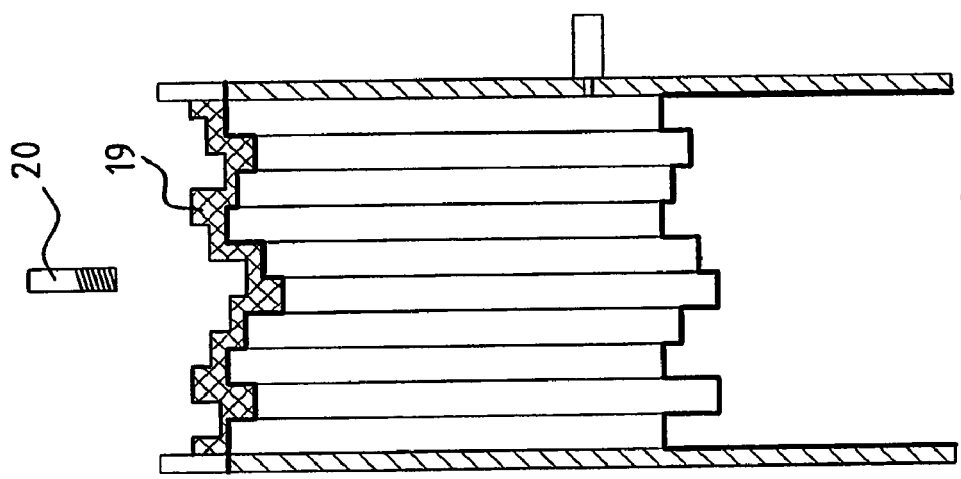
Figure 11:
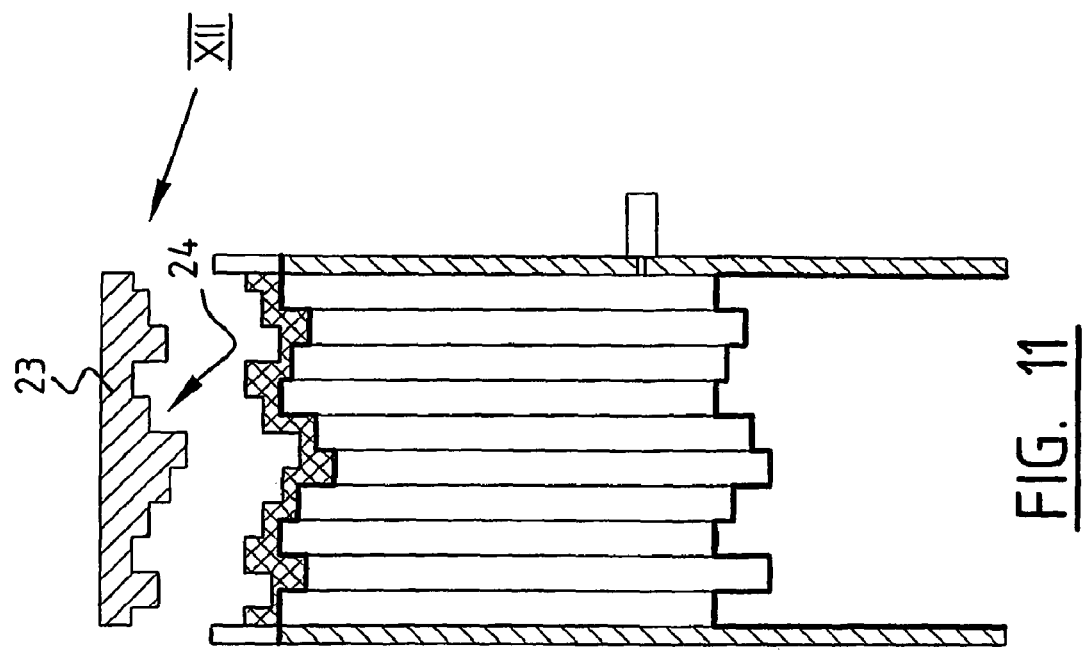
Figure 10:
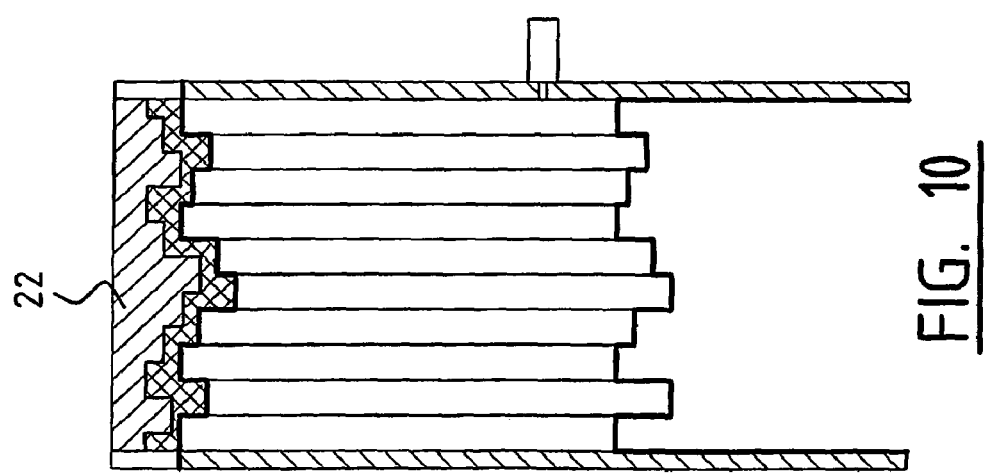

FIG. 8 shows that a symbolically represented cutter 20 can be used to cut back the profile 18 of polyurethane foam 17 to contour 19, whereafter the remaining layer of polyurethane foam 17 can be sprayed with a finishing agent 20 on the side shown schematically in FIG. 9, which agent can be any agent for sealing and impregnating the polyurethane foam so that the desired contour 19, which after cutting operation 20 corresponds exactly with a side of a product for manufacturing, is retained when curable material, such as concrete 22 in FIG. 10, is poured onto the thus impregnated polyurethane foam 17. After curing thereof a concrete block 23 is obtained as desired product with the desired shape on the underside 24 thereof as shown in FIG. 11.

Figure 12:
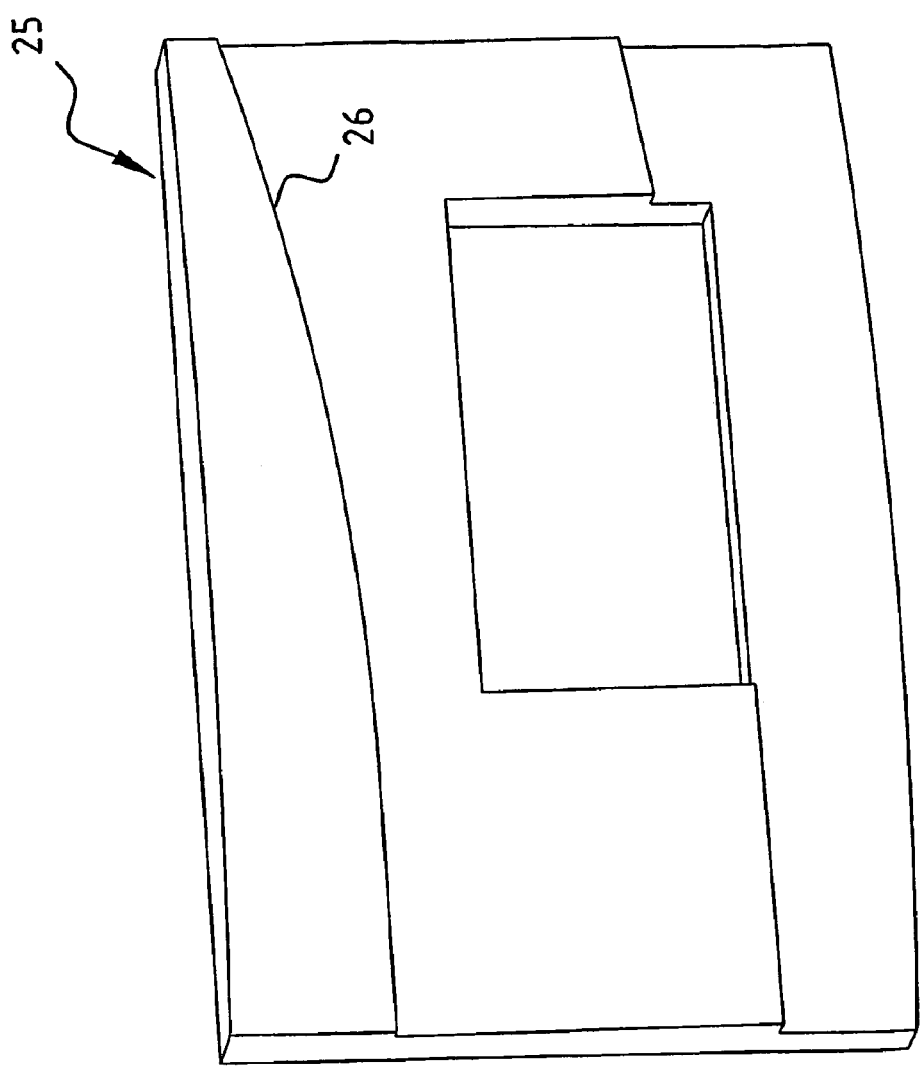
FIG. 12 shows a possible product of this first embodiment.

FIG. 12 shows that such a product, i.e. a concrete construction element 25, can be obtained with gradually varying shapes, such as the curved shape 26 on the front side thereof.

Figure 15:
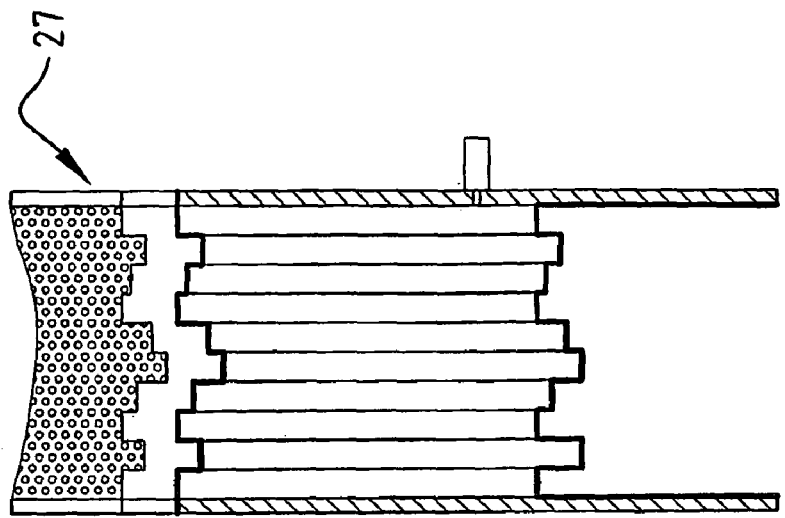
FIG. 13-15 show a second embodiment.
Figure 14:
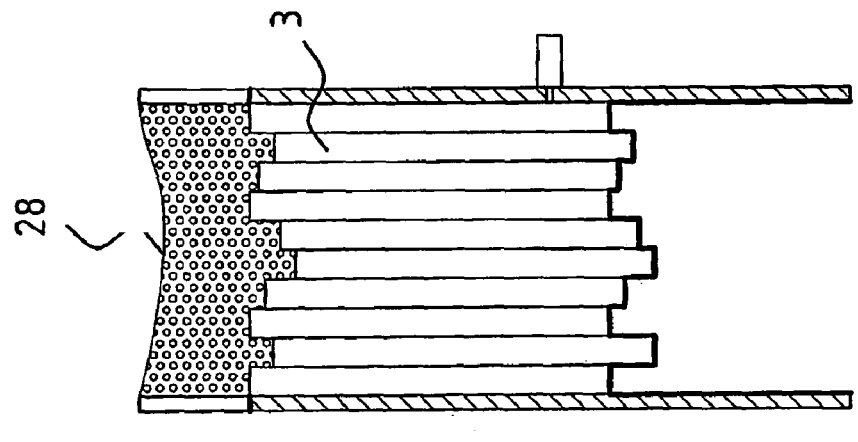
Figure 13:
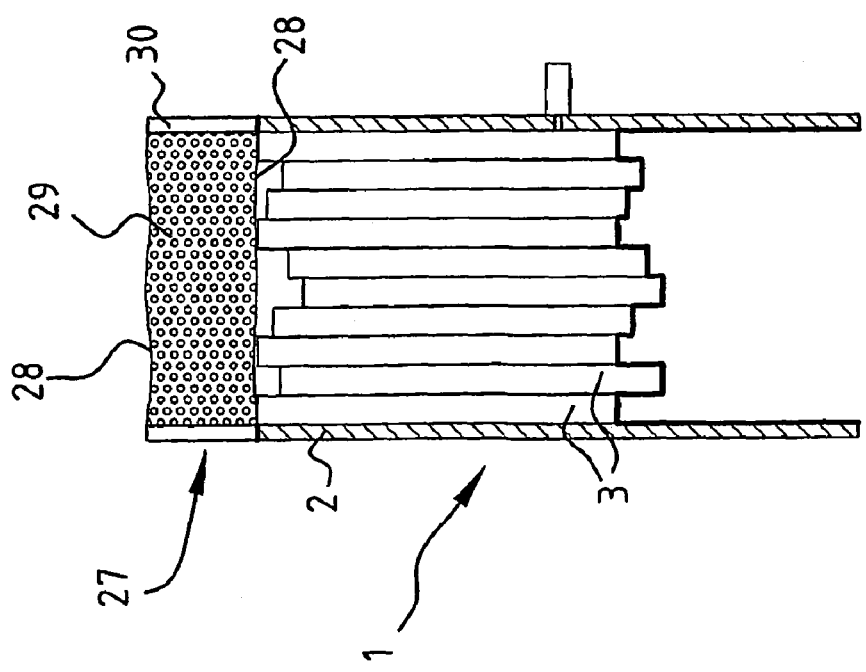

FIG. 13-15 show an alternative to copying means 11 of the foregoing figures, i.e. a vacuum package 27 which can be placed on the set adjusting unit 1. Vacuum package 27 comprises two membranes 28 and granular material 29 between walls 30 which can be placed on holder 2 of adjusting unit 1. By then applying an underpressure to the space beneath lower membrane 28, lower membrane 28 is pulled into close connection against the top sides of the adjusting elements embodied as tubular profiles 3. The shape which the membrane then acquires is held fast by adjusting the pressure in vacuum package 27 accordingly. As shown in FIG. 15, vacuum packet 27 can then be lifted, wherein the shape on the top side of adjusting elements 3 is accurately taken over and retained.

Figure 16:
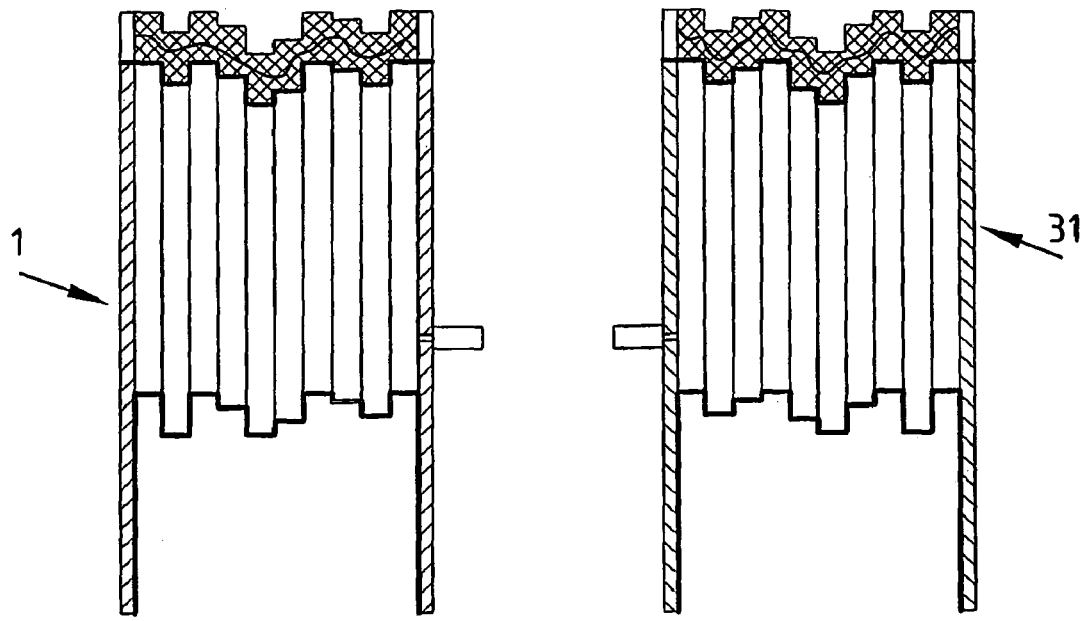
FIG. 16-19 show a third embodiment.
Figure 17:
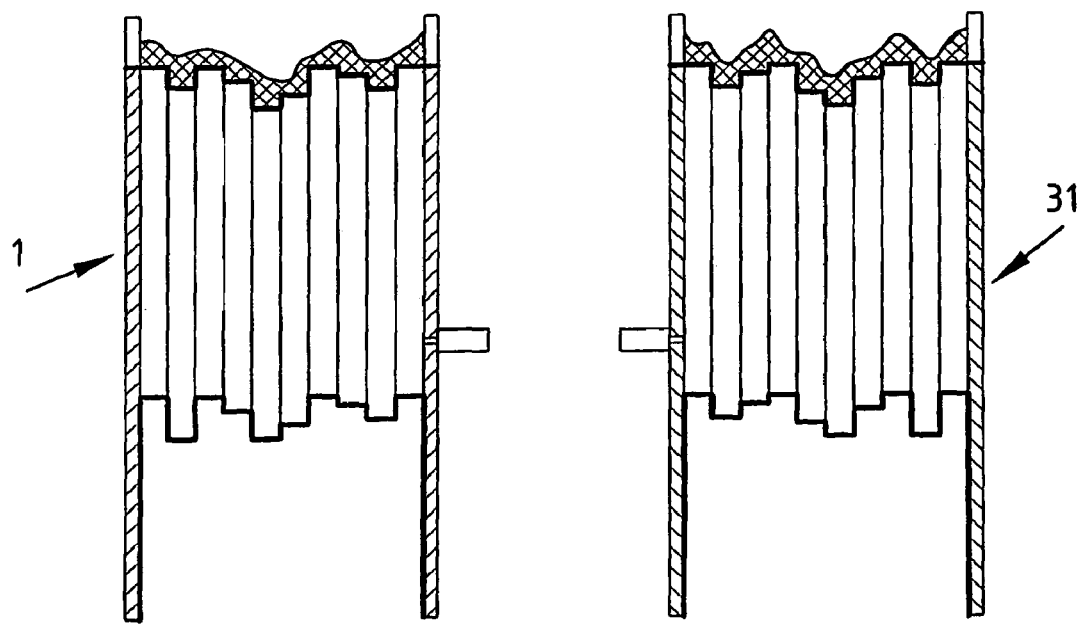
Figure 18:
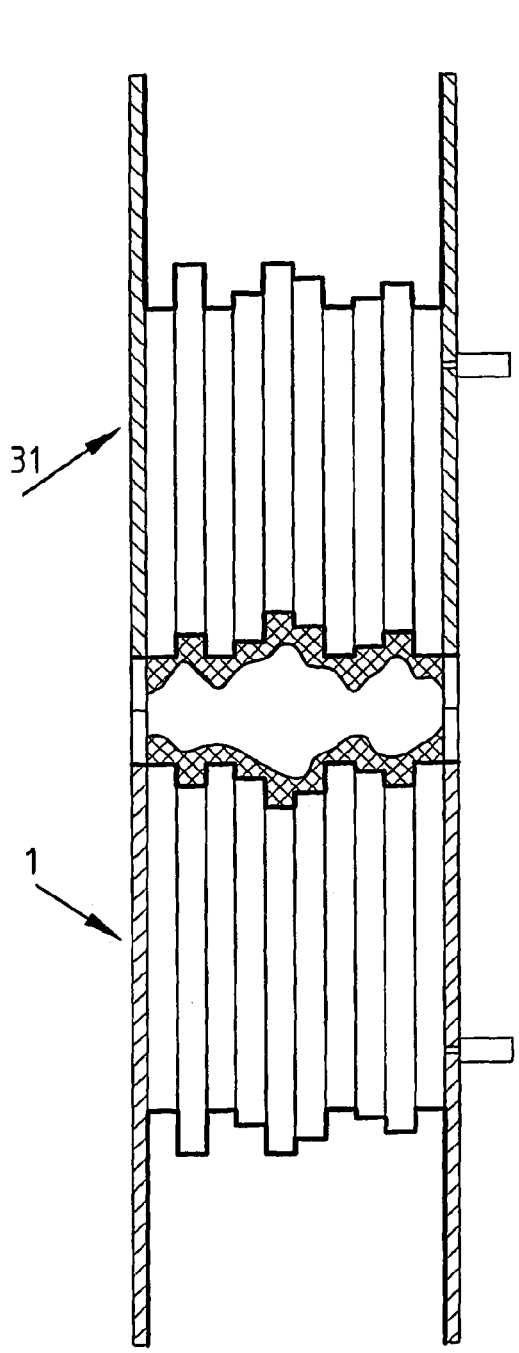
Figure 19:
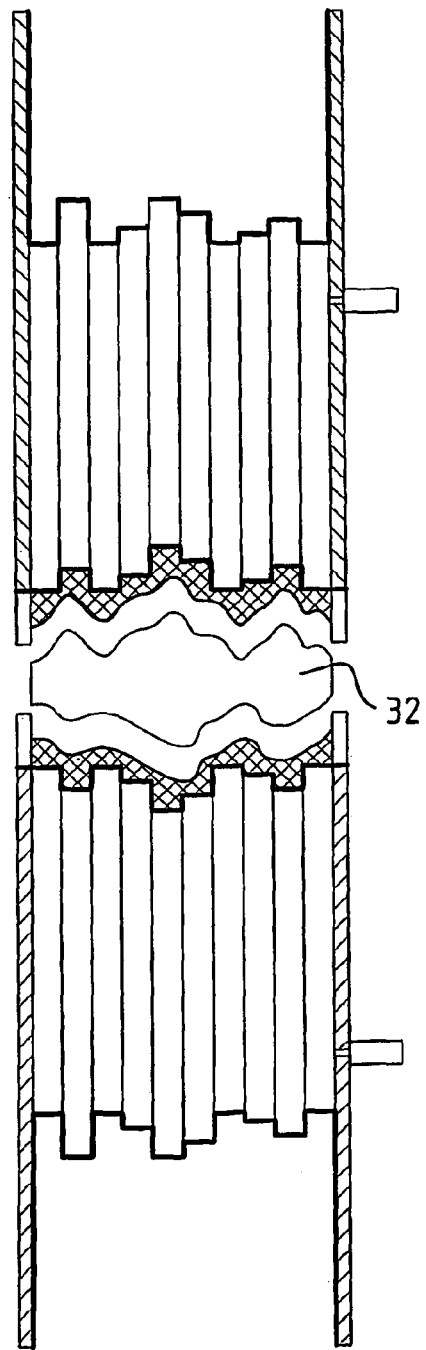
Figure 20:
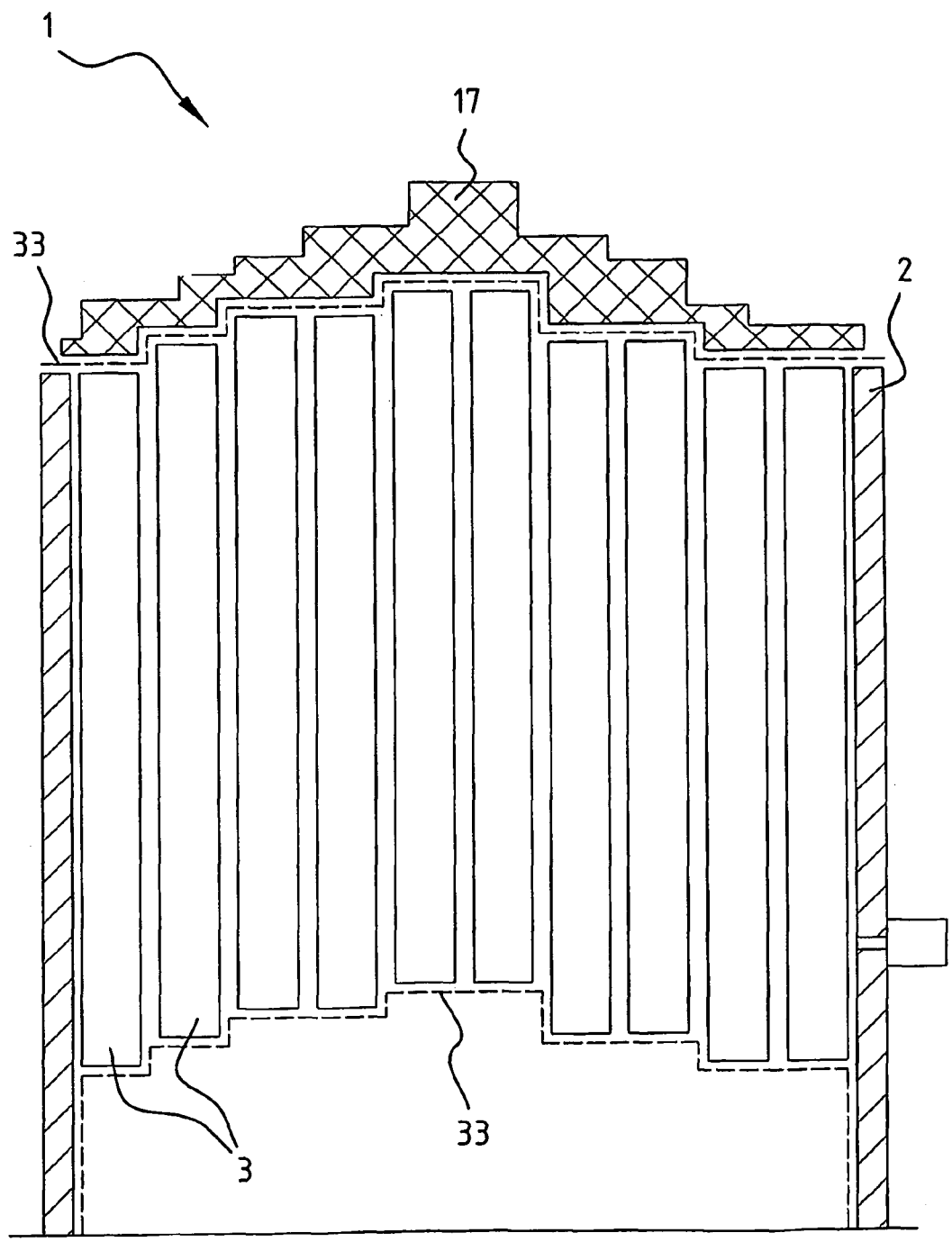

FIG. 16-19 show an embodiment based on two adjusting units 1 and 31, which are each manufactured separately of each other in a manner corresponding with the present invention, as shown in FIG. 16. FIG. 17 shows the situation after a machining process, wherein the layer of material for processing, for instance polyurethane foam, is cut back in order to realize the desired contour thereof, wherein each of the adjusting unit 1 and adjusting unit 31 defines one side of the product for manufacturing. The latter is clearly shown in FIG. 18, where adjusting units 1 and 31 are placed one on the other, between which a product 32 can then be manufactured, for instance a block of concrete with very fanciful shapes and a very wide range of applications.

Figure 21:
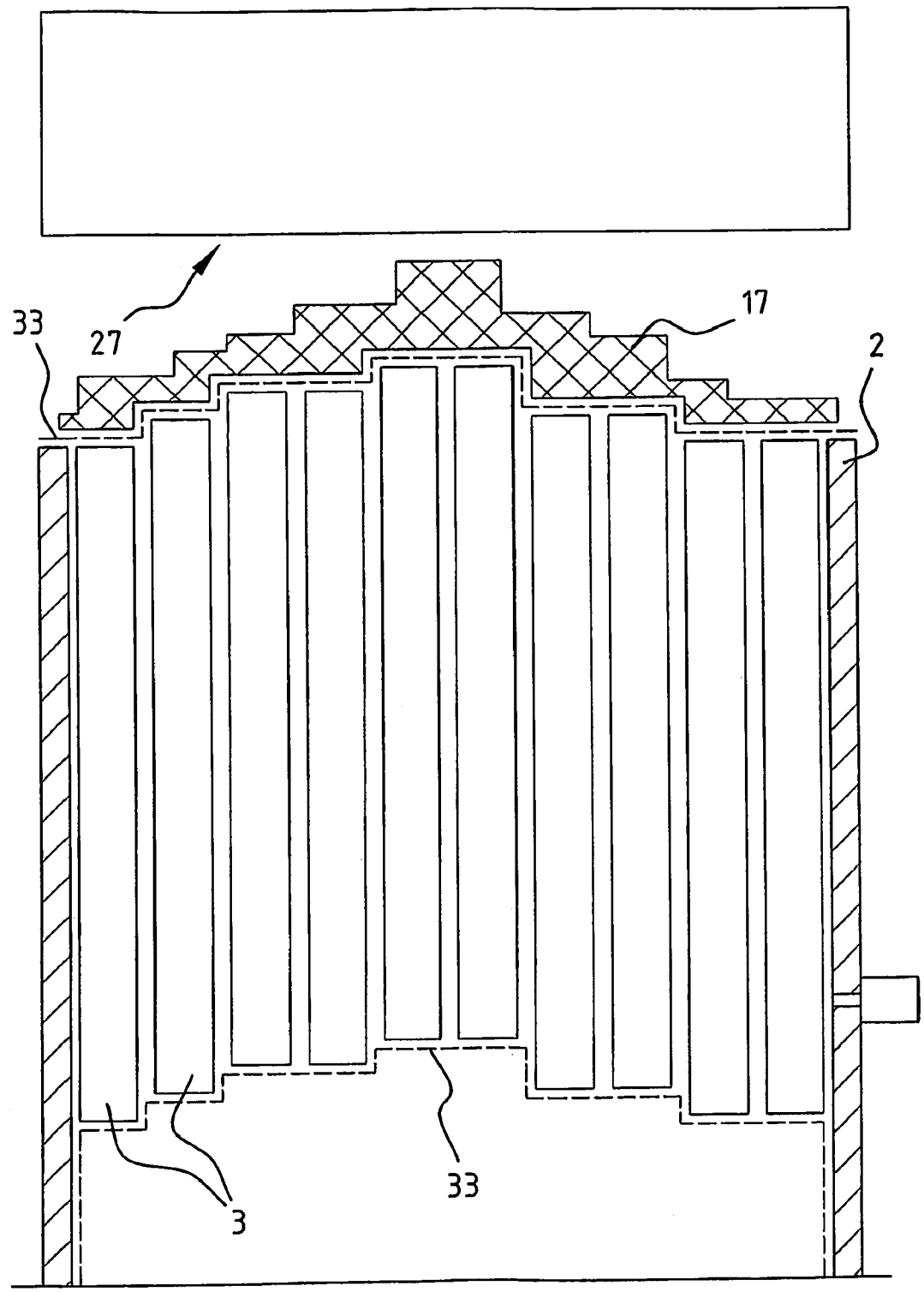
Figure 22:
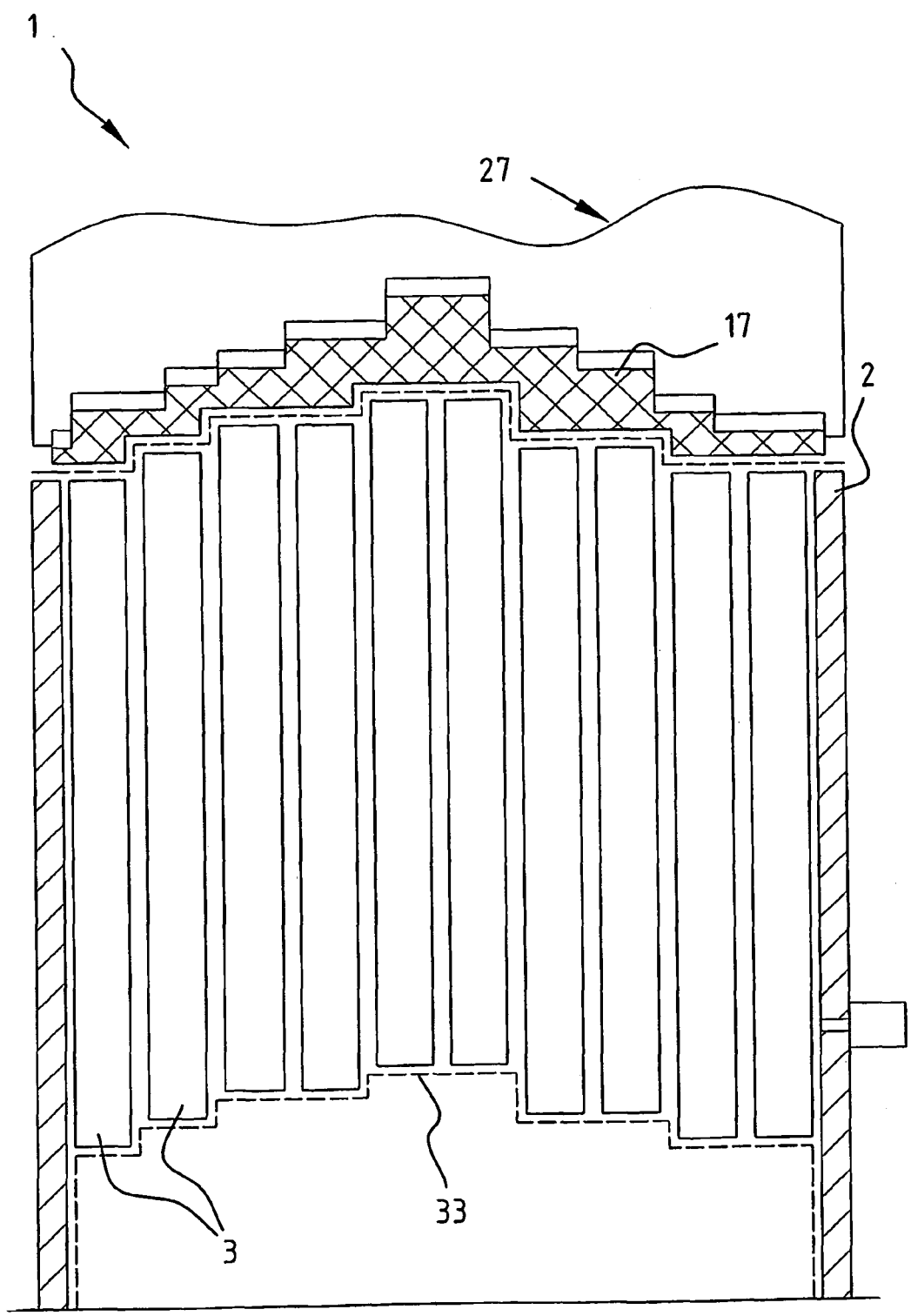
Figure 23:
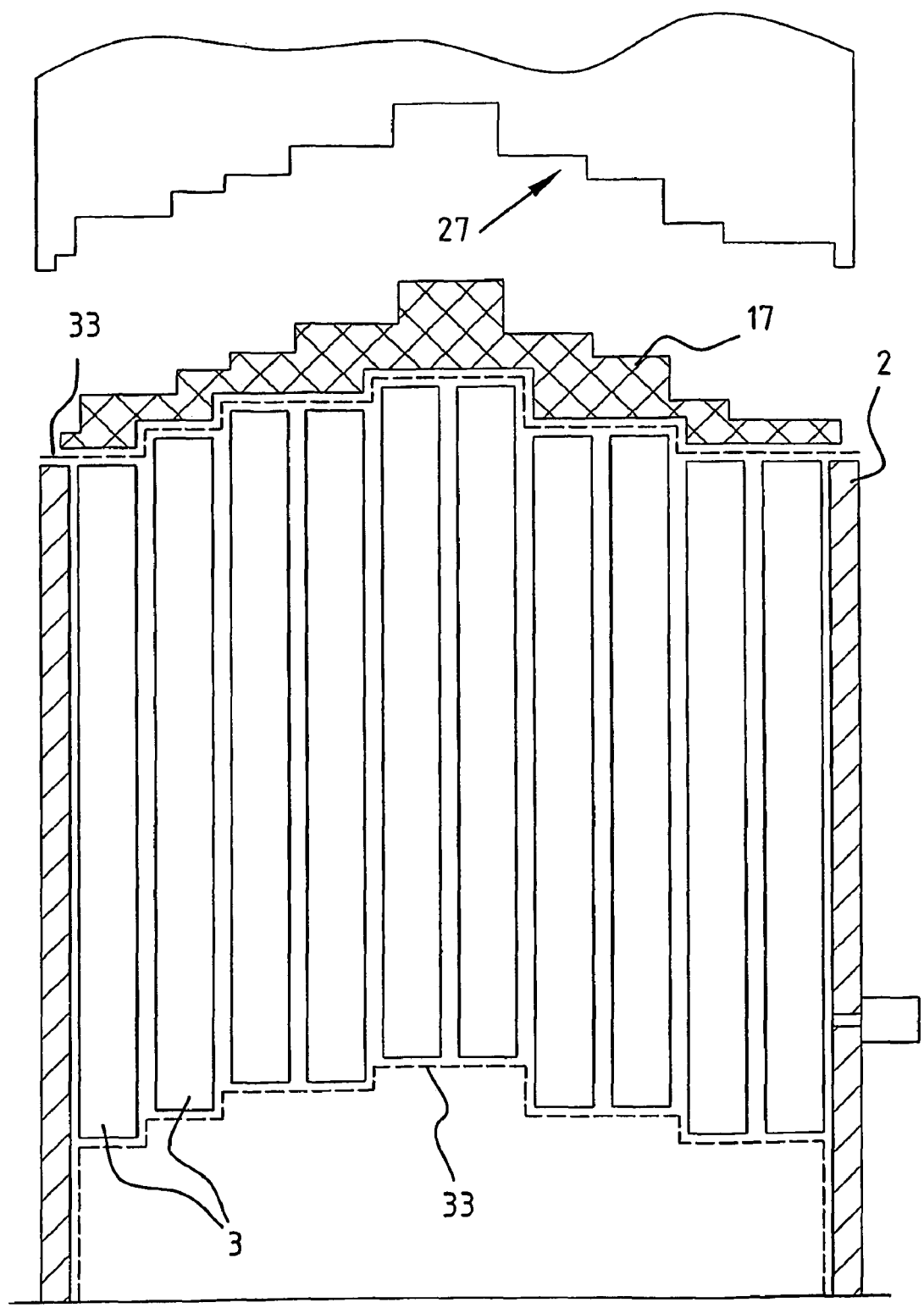

The remaining figures once again show another additional or alternative embodiment of the invention. Use is again made here of an adjusting unit 1, of which the adjusting elements embodied as tubular profiles 3 are positioned in random manner so as to take on a roughly approximate shape, this shape approximating the final shape of a side of a product for manufacturing. Preferably arranged at both top and bottom over the end surfaces of tubular profiles 3 is a schematically represented sheet 33 which is held against the end surfaces of tubular profiles 3 by means of underpressure in the space below sheet 33. A layer of processable material such as polyurethane foam 17 is arranged over sheet 33 in a more broadly dimensioned layer than is necessary to achieve the desired contour, but having substantially the same contour as the underside shown in FIGS. 22 and 23 of the shown vacuum package 27. A vacuum package such as is also applied in FIG. 13-15 is placed on the thus obtained construction, as shown in FIG. 21. As shown in FIG. 22, this vacuum package then takes on the shape of the (too broadly dimensioned) layer of polyurethane 17 on adjusting unit 1. As shown in FIG. 23, vacuum package 27 is then lifted from the layer of polyurethane 17.

Figure 24:
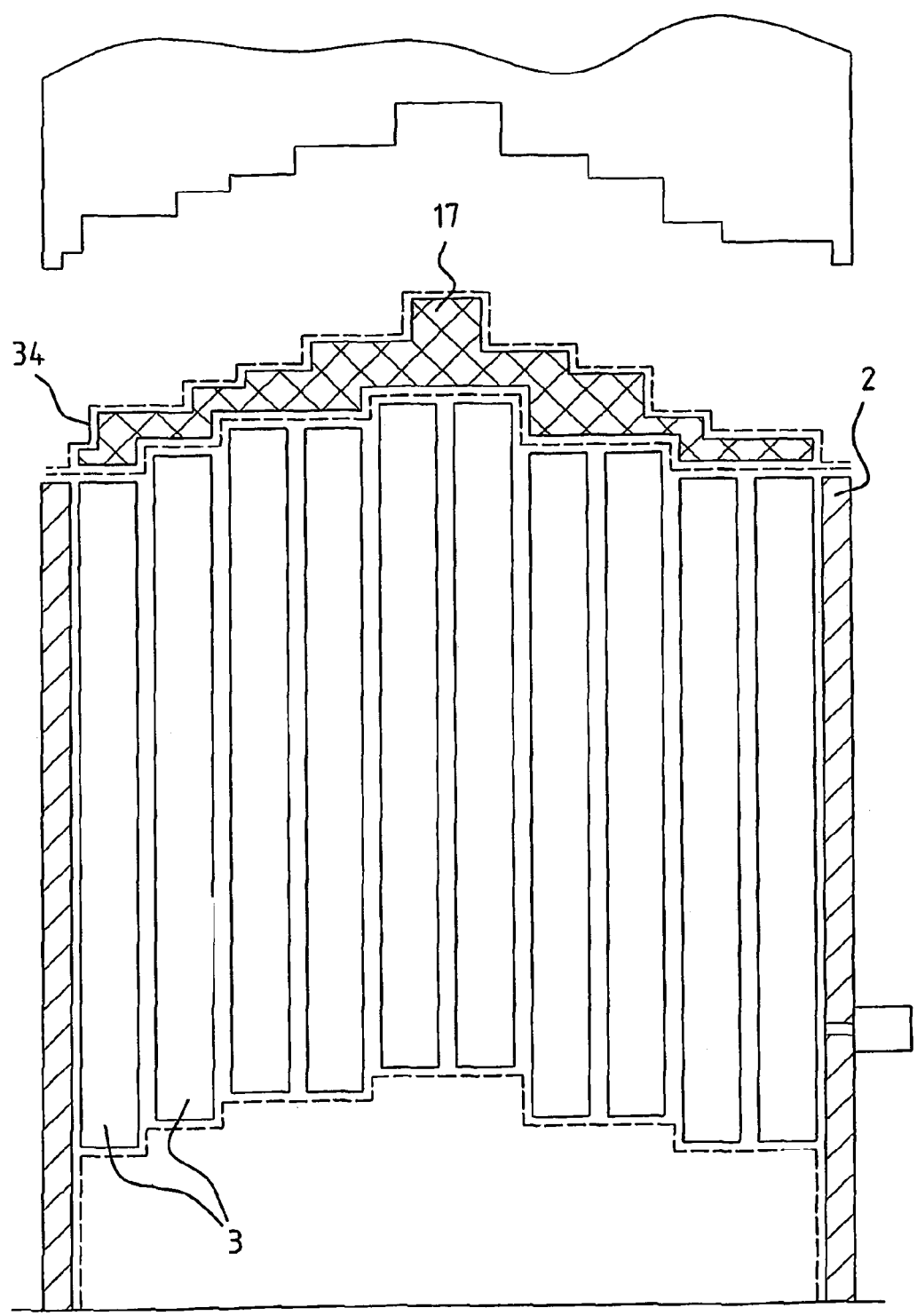
Figure 25:
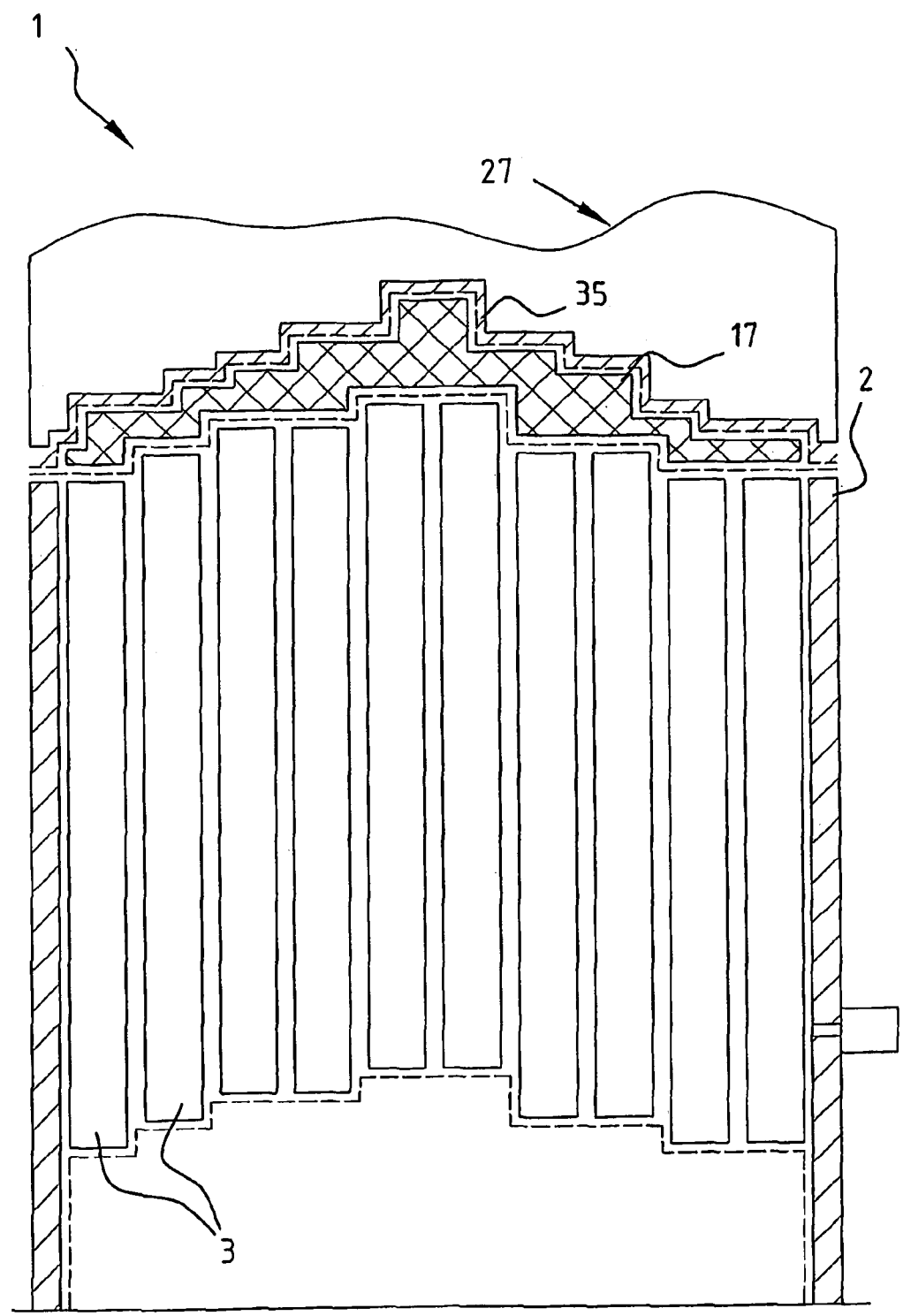
Figure 26:
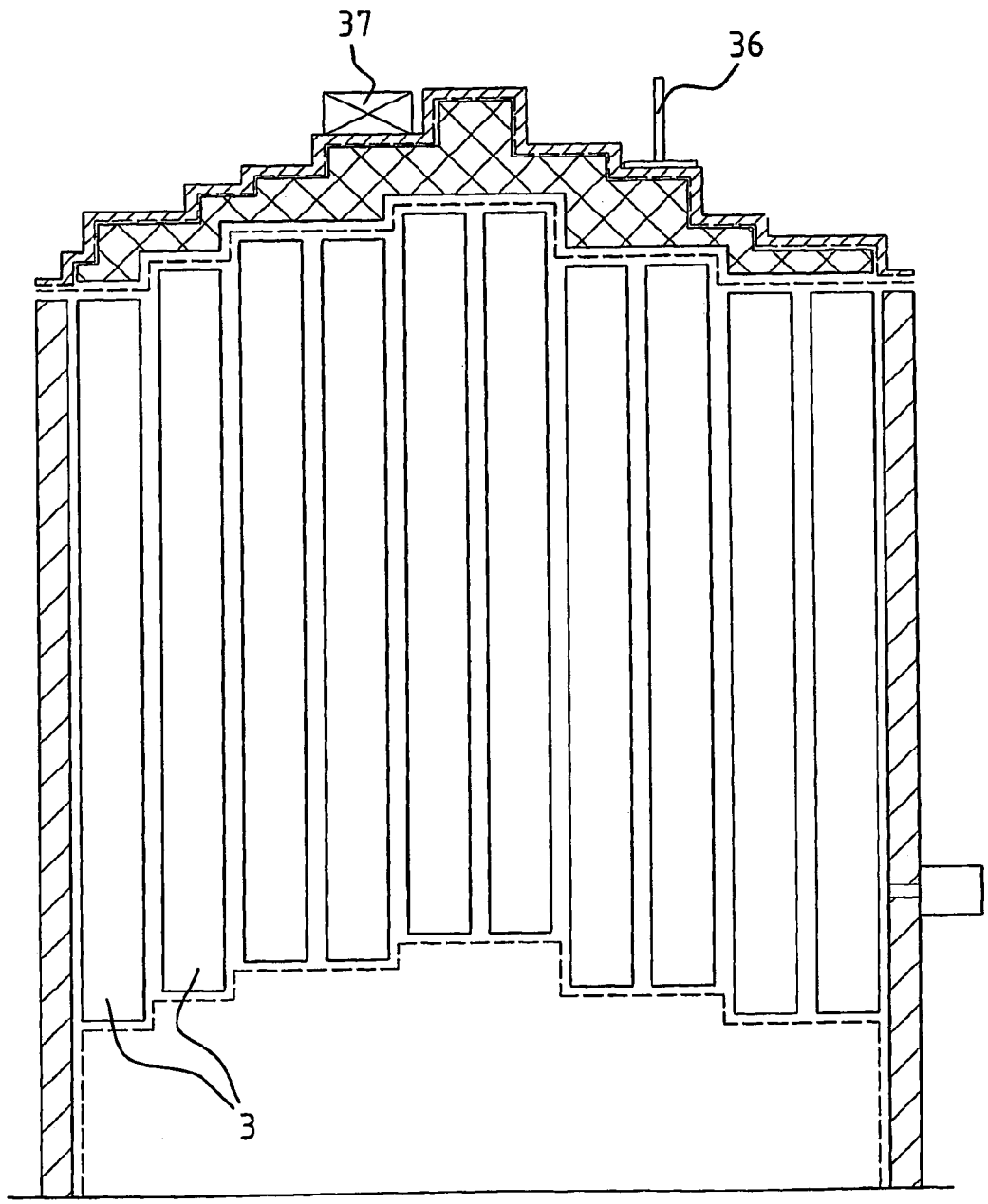
Figure 27:
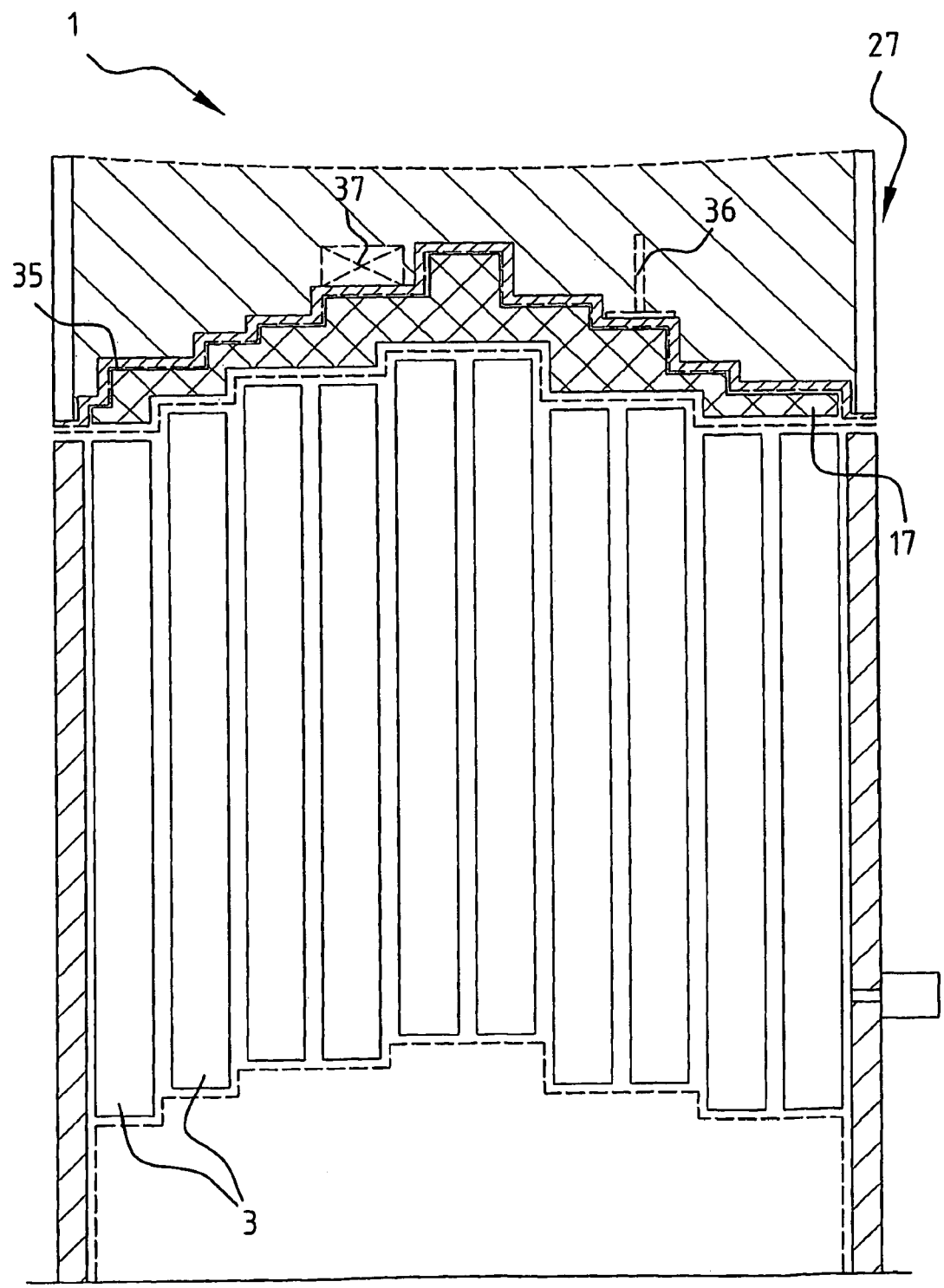
Figure 28:
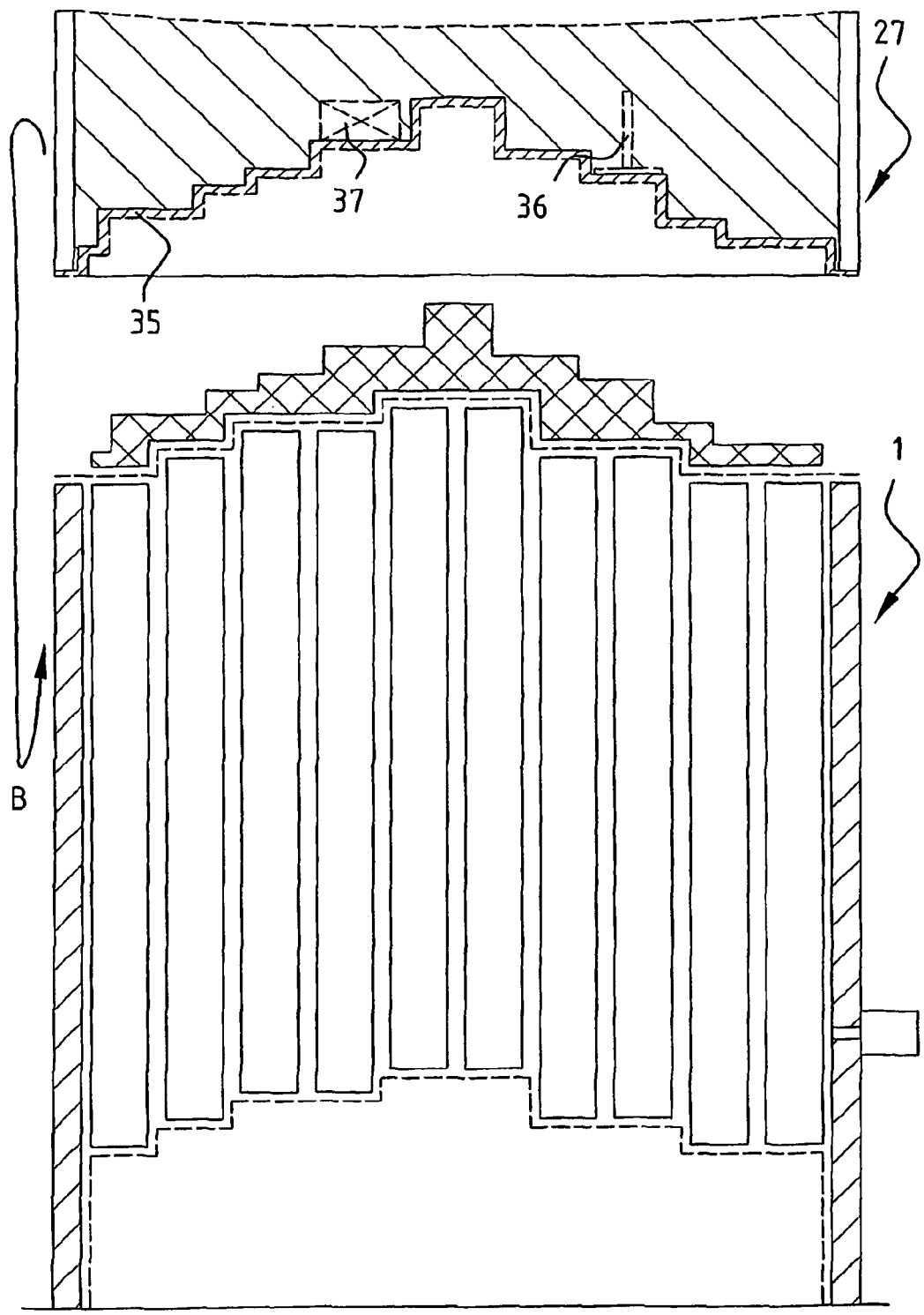

As shown in FIG. 24, the polyurethane foam is then machined, in particular using a cutter or the like, in order to obtain the desired contour. Because the layer of polyurethane foam 17 has a spherical shape, processing thereof is facilitated since the cutter or other random tool that is used does not have to reach into cavities, or in any case to a lesser extent. After machining of polyurethane foam 17 a foil 34 is stretched thereover. The foil 34 is therefore an alternative to the sprayed agent of FIG. 9. As shown in FIG. 25, vacuum package 27 is subsequently placed on adjusting unit 1 again, with a material, which is perhaps more eminently suitable for use as mould part 35, between vacuum package 27 and adjusting unit 1 with polyurethane layer 17 thereon. This can be a curable material, for instance a thermoplastic layer which cures at higher temperatures, a cement or plaster layer, and so on. After forming of mould part 35 vacuum package 27 is lifted again to make room for the placing of additional components 36 and 37, as shown in FIG. 26, which components will be further described below and which must be incorporated in the final product. Vacuum package 27 is again then placed on the thus formed assembly, as shown in FIG. 27, in order to pick up mould part 35 with additional components 36 and 37 from adjusting unit 1, as shown in FIG. 28, whereafter the vacuum package can be turned over, which is indicated with arrow B in FIG. 28, in order to obtain the situation shown in FIG. 29. In contrast to the above applied vacuum packages, the vacuum package can alternatively consist of a tubular housing, which is connected air-tightly to the foil on the underside. The housing can then be filled (up to the edge) with a granulate and sealed air-tightly at the top by a flexible membrane, whereafter a state of vacuum can be created in this vacuum package. The mould part is hereby fixed in the vacuum package, and embedded in the vacuum package and connected to the vacuum package in form-retaining manner. The additional elements 36, 37 can herein serve to receive elements at the front in the concrete product. A plate 38 can thus be arranged on additional component 37 by means of magnetism, and a threaded end 39 can be inserted into additional component 36. As shown in FIG. 30, concrete 40 is then poured onto mould part 35 in order to cure. FIG. 31 then shows that the cured concrete product 41 is removed from mould part 35, wherein plate 38 and threaded end 39 are fixed and/or recessed into concrete product 41.

Figure 33A:
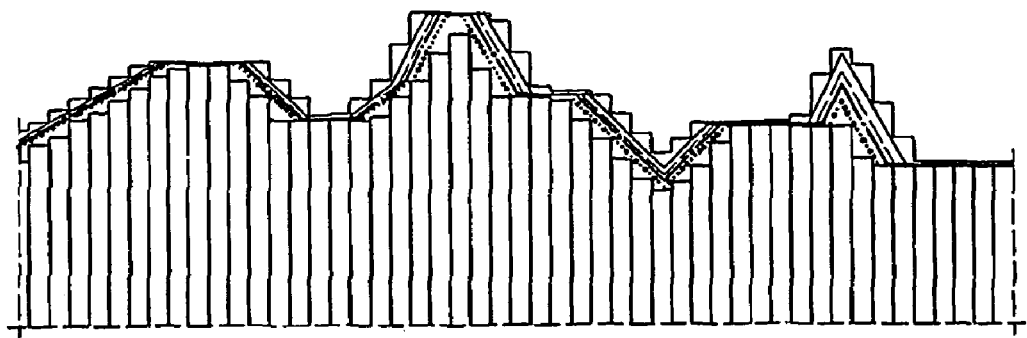
FIGS. 33A and 33B show combined or composite views of the steps in the method according to the present invention shown in FIG. 32A-32D.
Figure 33B:
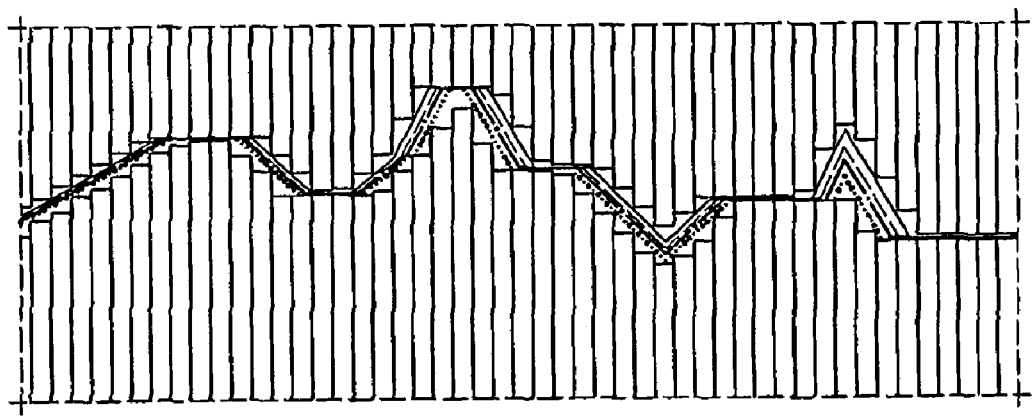
Figure 34:
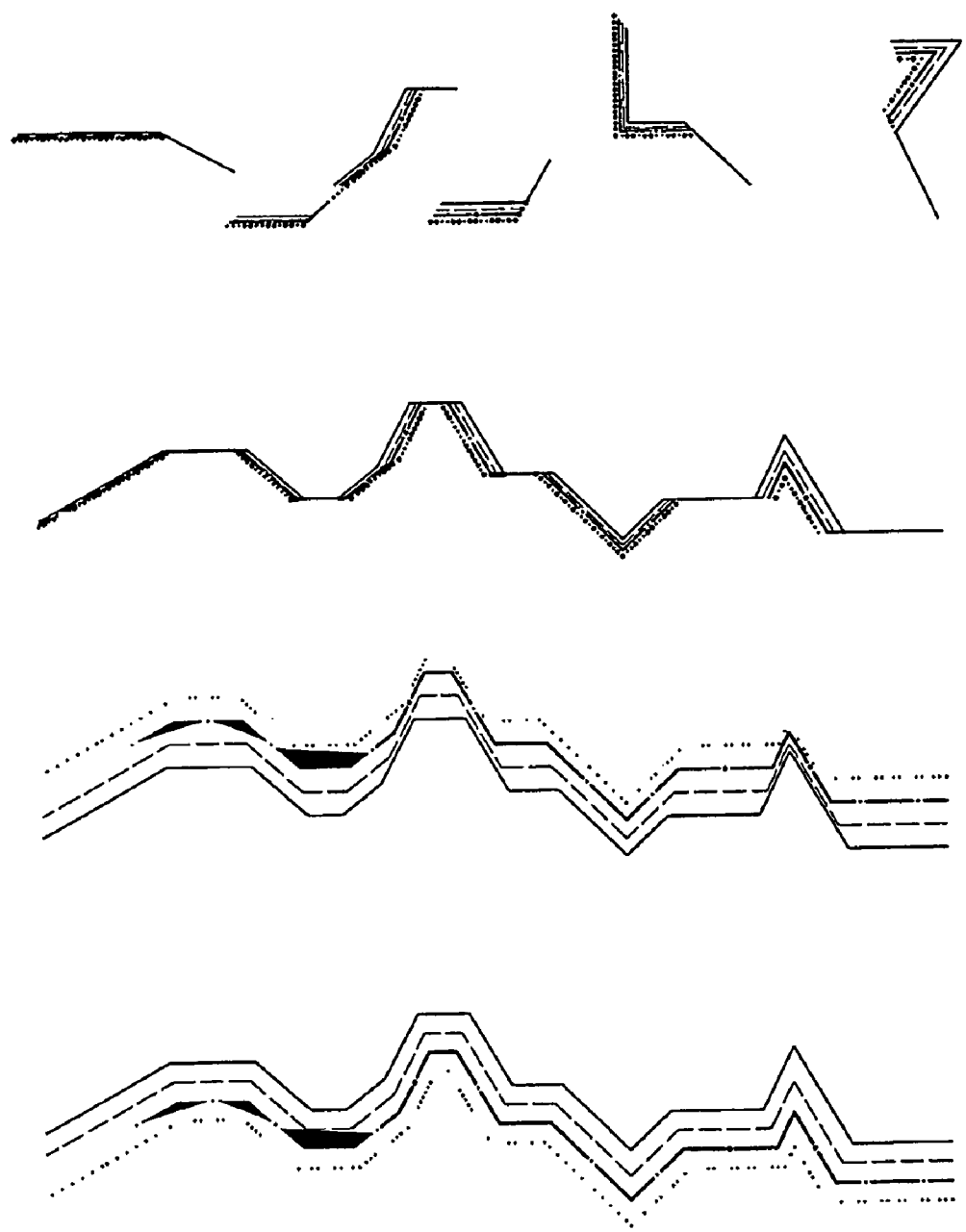
FIG. 34 shows a composite view of the steps carried out according to FIGS. 32 and 33.

FIG. 32A-32D show successive steps of a method according to the present invention based on growth. Use is made here of progressively placing layers in accordance with a predetermined design. The same is shown in FIGS. 33A and 33B, with a composite view in FIG. 34.

Figure 32A:
FIG. 32A-32D show the progression of a method according to the present invention based on growth.
Figure 32B:
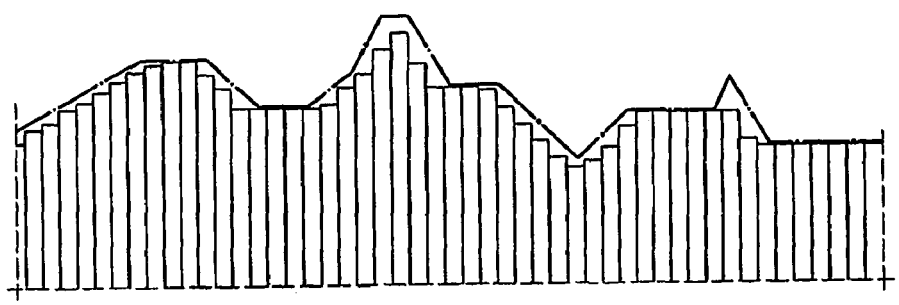
Figure 32C:
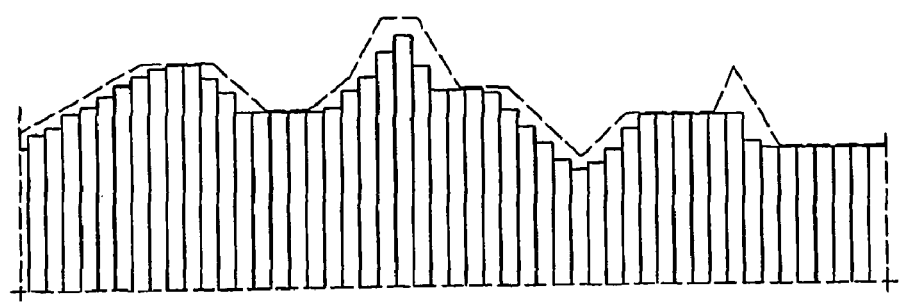
Figure 32D:
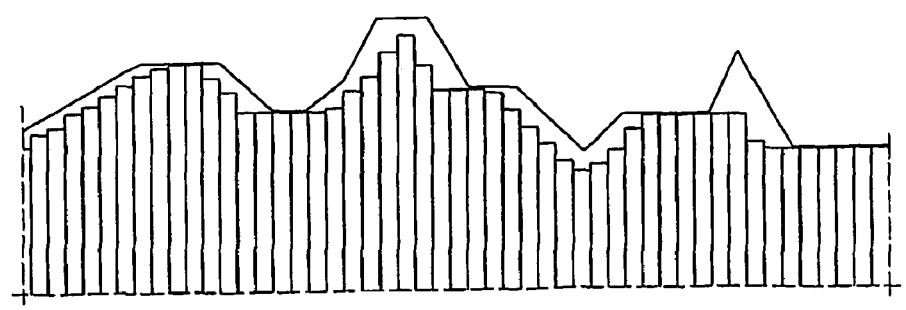

It is clearly shown that in FIG. 32A a thin layer is formed in accordance with the overall design of tubular profiles 3. This can be realized with the method shown in FIGS. 33A and 33B, wherein selected tubular profiles 3 are progressively retracted on the top side so as to create more intermediate space. The algorithm is shown in its entirety in FIG. 33.

After the foregoing description of specific embodiments of the invention, to which however the scope of protection of the invention is not limited, many alternative and additional options will occur to the skilled person. Diverse combinations of aspects of the different embodiments are for instance possible, which must therefore not be seen as mutually exclusive but as disclosures which can be combined.

The invention claimed is:

1. Method for manufacturing a mould for the manufacture of at least one product, comprising:
    adjusting a shape of an adjusting unit to roughly approximate a shape of a side of the product;
    copying the rough shape of the adjusting unit by arranging at least one copying device on the adjusting unit so that the copying device takes on a complimentary profile of the rough shape;
    arranging a layer of processable material between the copying device and the adjusting unit and over the rough shape of the adjusting unit, the processable material being separate from the at least one product;
    seperating the copy device from the processable material;
    processing the processable material to a desired shape of the side of the at least one moulded product, thereby attaining the mould for the manufacturer of the at least one product.

2. Method as claimed in claim 1, wherein the adjusting of the rough shape of the adjusting unit includes,
    using the adjusting unit with a holder and a number of adjusting elements associated therewith, moveable individually or as a group relative to each other and the holder, and with at least one arresting device to fix the adjusting elements;
    placing the adjusting elements in desired positions thereof; and
    setting the at least one arresting device into operation.

3. Method as claimed in claim 2, wherein placing of the adjusting elements in a desired position includes,
    using at least one drive displaceable relative to the holder and to the adjusting elements;
    positioning the drive relative to a selected adjusting element; and
    energizing the drive until the selected adjusting element takes up the desired position.

4. Method as claimed in claim 3, wherein the drive is a cylinder configured to operate using at least one of hydraulics and pneumatics.

5. Method as claimed in claim 1, further comprising:
    arranging a second copying device on the adjusting unit so that the second copying device takes on the complimentary profile of the rough shape;
    arranging a second layer of processable material between the second copying device and the adjusting unit and over the rough shape of the adjusting unit, the second layer of processable material being separate from the at least one product;
    separating the second copying device from the second layer of processable material;
    processing the second layer of processable material to the desired shape of the side of the at least one moulded product, thereby attaining a counter-mould for the manufacturer of the at least one product.

6. Method as claimed in claim 1, wherein the at least one copying device comprises:
    an adjusting unit with a holder and a number of adjusting elements associated therewith, moveable individually or as a group relative to each other and the holder, and with at least one arresting device to fix the adjusting elements.

7. Method as claimed in claim 6, further comprising:
    arranging a second layer of processable material on the at least one copying device, the second layer of processable material being separate from the at least one product; and
    processing the second layer of processable material in accordance with the shape of another side of the product,
    wherein the processable material and the second layer of processable material is configured to remain on the adjusting unit and the copying device, respectively, during manufacturing of the product.

8. Method as claimed in claim 1, further comprising:
arranging the copying device directly on the layer of processable material, following the processing of the processable material, to ensure that the at least one copying device takes on the exact desired shape of the side of the product for the purpose of making another mould.

9. Method as claimed in claim 1, wherein the at least one copying device comprises a vacuum package.

10. Method as claimed in claim 1, wherein the processable material is a foam material, such as polyurethane.

11. Method of claim 1, wherein,
the processing of the processable material includes machining the processable material into the desired shape of the side of the product,
the processing of the processable material step occurring before the copying of the rough shape by the copying device.

12. Method as claimed in claim 11, wherein the machining includes using a computer-controlled machine.

13. Method as claimed in claim 12, wherein the computer-controlled machine is a CNC cutting machine.

14. Method for manufacturing a product, comprising:
manufacturing at least one mould according to the method of claim 1;
filling the mould with curable material for the product; and
curing the material.

15. Method as claimed in claim 1, wherein the at least one copying device comprises:
another adjusting unit with a holder and a number of adjusting elements associated therewith, moveable individually or as a group relative to each other and the holder, and with at least one arresting device to fix the adjusting elements.

* * * * *